(12) United States Patent
Thanos et al.

(10) Patent No.: US 12,544,545 B2
(45) Date of Patent: Feb. 10, 2026

(54) MACROENCAPSULATION DEVICES

(71) Applicant: Vertex Pharmaceuticals Incorporated, Boston, MA (US)

(72) Inventors: Christopher Thanos, Cumberland, RI (US); Danya M. Lavin, Mansfield, MA (US); John Mills, Warwick, RI (US); Megan Billings, Warwick, RI (US)

(73) Assignee: Vertex Pharmaceuticals Incorporated, Boston, MA (US)

( * ) Notice: Subject to any disclaimer, the term of this patent is extended or adjusted under 35 U.S.C. 154(b) by 1165 days.

(21) Appl. No.: 17/600,670

(22) PCT Filed: Apr. 2, 2020

(86) PCT No.: PCT/US2020/026429
§ 371 (c)(1),
(2) Date: Oct. 1, 2021

(87) PCT Pub. No.: WO2020/206150
PCT Pub. Date: Oct. 8, 2020

(65) Prior Publication Data
US 2022/0175511 A1    Jun. 9, 2022

Related U.S. Application Data

(60) Provisional application No. 62/828,915, filed on Apr. 3, 2019.

(51) Int. Cl.
*A61F 2/02* (2006.01)
*A61K 9/00* (2006.01)
(Continued)

(52) U.S. Cl.
CPC .......... *A61M 31/002* (2013.01); *A61F 2/022* (2013.01); *A61K 9/0024* (2013.01); *A61K 35/39* (2013.01);
(Continued)

(58) Field of Classification Search
None
See application file for complete search history.

(56) References Cited

U.S. PATENT DOCUMENTS

| 5,344,454 | A | 9/1994 | Clarke et al. |
| 5,713,888 | A | 2/1998 | Neuenfeldt et al. |

(Continued)

FOREIGN PATENT DOCUMENTS

| CN | 105163688 A | 12/2015 |
| EP | 2356227 A2 | 8/2011 |

(Continued)

OTHER PUBLICATIONS

Barkai, U. et al., Survival of encapsulated islets: More than a membrane story, World J. Transplant., 6 (Mar. 24, 2016) pp. 69-90. (Year: 2016).*

(Continued)

*Primary Examiner* — Dominic Lazaro
(74) *Attorney, Agent, or Firm* — Wolf, Greenfield & Sacks, P.C.

(57) ABSTRACT

The present disclosure relates to macroencapsulation devices and related methods of manufacture where the membranes of a device may be mounted to an associated frame in a relaxed, or slack, configuration prior to filling with a desired material.

23 Claims, 18 Drawing Sheets

(51) Int. Cl.
  *A61K 35/39* (2015.01)
  *A61M 31/00* (2006.01)
  *B01D 69/02* (2006.01)
  *C12N 5/071* (2010.01)

(52) U.S. Cl.
  CPC ........... *B01D 69/02* (2013.01); *C12N 5/0676* (2013.01); *A61M 2205/04* (2013.01); *A61M 2207/00* (2013.01); *B01D 2325/0283* (2022.08)

(56) References Cited

U.S. PATENT DOCUMENTS

| | | | |
|---|---|---|---|
| 8,834,979 | B2 | 9/2014 | Piranda |
| 2009/0298181 | A1 | 12/2009 | Watanabe et al. |
| 2010/0121446 | A1* | 5/2010 | Bruce ..................... A61L 27/04 |
| | | | 29/428 |
| 2018/0125632 | A1 | 5/2018 | Cully et al. |
| 2018/0263238 | A1 | 9/2018 | Flanagan et al. |
| 2019/0201323 | A1 | 7/2019 | Thanos et al. |
| 2022/0143374 | A1 | 5/2022 | Thanos et al. |

FOREIGN PATENT DOCUMENTS

| | | | | |
|---|---|---|---|---|
| EP | 3428264 | A1 | 1/2019 | |
| JP | 07-508187 | A | 9/1995 | |
| JP | 2002-537422 | A | 11/2002 | |
| JP | 2017-042477 | A | 3/2017 | |
| WO | WO-2015048184 | A1 * | 4/2015 | ............. A61F 2/022 |

OTHER PUBLICATIONS

[No Author Listed], Vertex to Acquire ViaCyte, With the Goal of Accelerating its Potentially Curative VX-880 Programs in Type 1 Diabetes. Business Wire. Jul. 11, 2022. Accessible from <https://www.businesswire.com/news/home/20220711005280/en/> 2 pages.
International Search Report and Written Opinion, mailed Jul. 2, 2020 for Application No. PCT/US2020/026429.

* cited by examiner

MACROENCAPSULATION DEVICES

CROSS-REFERENCE TO RELATED APPLICATIONS

This application is a national stage filing under 35 U.S.C. § 371 of International Patent Application Serial No. PCT/US2020/026429, filed Apr. 2, 2020, which claims the benefit under 35 U.S.C. § 119 (e) of U.S. Provisional Application Ser. No. 62/828,915, filed Apr. 3, 2019, each of which is incorporated herein by reference in its entirety.

FIELD

Disclosed embodiments are related to macroencapsulation devices and their methods of manufacture.

BACKGROUND

Therapeutic devices that deliver biological products can be used to treat metabolic disorders, such as diabetes. The therapeutic devices may be implantable to provide a biological product, such as insulin, for an extended period of time. Some of these devices include macroencapsulation devices used to house cells to produce the desired biological product, a matrix including the cells, or other desired therapeutics within.

SUMMARY

In one embodiment, a macroencapsulation device for housing a population of cells includes a first membrane and a second membrane disposed on the first membrane. The first membrane and the second membrane are bonded along a perimeter of the first and second membranes to form an internal volume there between, and the first membrane and/or the second membrane is semipermeable. The device also includes a frame that extends along at least a portion of the perimeter of the first and second membranes, and a surface area of the first and/or second membrane is greater than a transverse cross sectional area of the frame the first and second membranes are mounted within.

In another embodiment, a macroencapsulation device for housing a population of cells includes a first membrane and a second membrane disposed on the first membrane. The first membrane and the second membrane are bonded along a perimeter of the first and second membranes to form an internal volume there between, and the first membrane and/or the second membrane is semipermeable. The device also includes a frame that extends along at least a portion of the perimeter of the first and second membranes, and a portion of the first and second membranes connected to the frame is deformed to fit within an area of the frame that is smaller than an area of the portion of the first and second membranes in an undeformed configuration.

In another embodiment, a method of forming a macroencapsulation device includes: deforming a portion of a first membrane and a second membrane disposed on the first membrane in a direction out of a plane of the first and second membranes; and connecting a frame to the second membrane and/or the first membrane while the portion of the first and second membranes is deformed out of plane, wherein the frame limits a maximum transverse dimension of the macroencapsulation device, wherein the first membrane and/or the second membrane is semipermeable.

In yet another embodiment, a method of forming a macroencapsulation device includes: deforming an outer perimeter of a first membrane and a second membrane disposed on the first membrane from a first maximum transverse dimension to a second maximum transverse dimension smaller than the first maximum transverse dimension; and connecting a frame to the second membrane and/or the first membrane to limit the maximum transverse dimension of the first and second membranes to the second maximum transverse dimension, wherein the first membrane and/or the second membrane is semipermeable.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
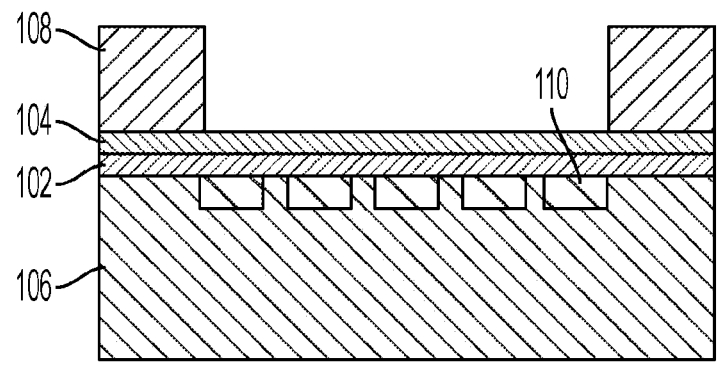
FIG. 1A shows a first and a second membrane disposed in a fixture during a bonding and cutting process according to one embodiment.

Driven by a rising need to deliver biological products to treat metabolic disorders, such as diabetes, different types of implantable therapeutic devices have been engineered. However, the Inventors have recognized that typical methods of making such devices are often cumbersome and hard to control. For instance, there is often a lack of precision and control in forming specific structural features (e.g., compartment height and volume) associated with the device. In addition, the Inventors have recognized that it is oftentimes difficult to controllably fill these devices with biological entities of interest (e.g., a population of cells) to a desired density and/or without causing excessive cell death and/or formation of agglomerations of cells.

In view of the above, the Inventors have recognized the benefits associated with macroencapsulation devices where the relative sizing and arrangement of the membranes and a frame of the device may be controlled to modify one or more parameters of the resulting macroencapsulation devices. For example, a relative sizing of the membranes and the associated frame may provide a simple and easily controllable method for producing macroencapsulation devices with a range of different dimensions and/or operating parameters as elaborated on below. This may include controlling an amount of slack in the membranes held in a frame prior to loading with a desired therapeutic such as a population of cells.

The above general concept of controlling an amount of slack in a membrane during mounting with a frame may be interchangeably referred to as slack mounting or mount relaxation herein. This concept may refer to the mounting of at least two or more layers of flexible membranes (e.g., a first membrane and a second membrane) under a controlled relaxed tension to form a device comprising internal compartments of a defined volume and/or height when filled. By adjusting the degree of membrane relaxation during the slack mounting process, a device with a desired set of geometrical properties can be fabricated to house a population of cells. For example, in some embodiments, the degree of membrane relaxation during a slack mounting process may be controlled by a combination of the degree of deformation introduced to the membranes during fabrication and mechanical constraints applied to the membranes (e.g., the use of a perimeter frame to limit the maximum transverse dimension of the membranes versus an overall surface area of the membranes) as described further below.

In some embodiments, during a manufacturing process of a macroencapsulation device, at least one, and in some instances at least two, or more flexible membranes of the device may be deformed to fit at least partially within and subsequently bonded to a frame to form the macroencapsulation device. The frame may hold the membranes in the desired configuration where the membranes have a desired amount of slack extending between opposing portions of the frame. For example, in one embodiment, an outer perimeter of a first membrane and a second membrane disposed on the first membrane may be deformed from a first maximum transverse dimension to a second maximum transverse dimension smaller than the first maximum transverse dimension prior to bonding with a frame. This deformation and subsequent holding of the membranes in the deformed configuration may cause the membranes to be held in the frame with a desired amount of slack to accommodate the excess material contained within the frame and may be accomplished in a number of different ways.

In one embodiment, a frame may be used to limit a maximum transverse dimension of a first and second membrane to a maximum transverse dimension that is smaller than a maximum transverse dimension of the membranes in the undeformed configuration. Specifically, a frame may be connected to the second membrane and/or the first membrane while a portion, such as a central portion, of the first and second membranes are deformed out of plane relative to a plane in which the membranes extend in a flat configuration. The frame may then limit the maximum transverse dimension of the macroencapsulation device once the force applying the out of plane deformation of the membranes is removed. Thus, the frame may cause a surface area of the first and/or second membrane to be greater than the second maximum transverse dimension which result in slack being present in the membranes between opposing portions of the frame.

As noted above, when a frame is connected to the deformed membranes of a macroencapsulation device during the manufacturing process, the frame may maintain portions of the membranes in a deformed configuration to provide a desired amount of slack in the membranes. For example, a first membrane and a second membrane may be bonded along a perimeter of the membranes. This bonded portion of the membranes may be deformed to fit within a frame that is bonded to and extends along at least a portion of a perimeter of the first and/or second membranes, though the frame may also extend along the entire perimeter of the membranes in some embodiments. Specifically, a portion of the first and second membranes connected to the frame may be deformed to fit within an area of the frame that is smaller than an area of the portion of the first and second membranes in an undeformed state. Specifically, to achieve a desired amount of membrane slack in the device, a frame with a maximum transverse dimension that is smaller than the transverse dimension of the membranes in an undeformed state may be connected to the membranes. In such an embodiment, the portion of the first and second membranes connected to the frame may include a plurality of locations disposed around a perimeter of the frame where the first and second membranes are deformed to accommodate the reduction in area. For example, in some embodiments, the deformed portions of the membrane may include wrinkles, pleats, corrugations, plastically or thermally deformed sections, and/or any other appropriate type of deformation capable of accommodating area change of these portions of the membranes from a first larger area to a second smaller area.

Depending on the desired construction, a frame of a macroencapsulation device may be disposed at any number of different locations relative to the different membranes of the device. For example, in one embodiment, a frame may be connected to an exterior surface of one of the outer membranes of a device. In one such embodiment, a first membrane may be disposed on a second membrane and a frame may be disposed on and connected to an outer surface of the second membrane opposite the first membrane. In another embodiment, the frame may be connected to both the first and the second membranes such that the frame is positioned between the membranes at a portion of the membranes which may be near or otherwise extend along at least a portion of a perimeter of the first and the second membranes. Accordingly, it should be understood that the current disclosure is not limited to any specific positioning of a frame relative to the individual membranes of a device.

In some embodiments, the volume and height associated with one or more portions of an internal volume of a macroencapsulation device may be controlled by adjusting the degree of membrane relaxation, i.e. slack, of the first and second membranes for a given membrane size and corresponding frame size. The amount of slack present in a membrane prior to filling with cells may be related to a difference in a surface area of the first and the second membranes during a mounting process to a corresponding transverse cross sectional area of the frame the membranes are mounted to, this may also be referred to as a relative mismatch in the sizing of the areas of the membranes and frame. The relative difference in these areas, and resulting slack in the mounted membranes, may be controlled by adjusting the size of the frame with respect to the size of the membranes. For example, a transverse cross sectional area of the frame may be less than a corresponding surface area of the membranes held within the frame. Thus, larger amounts of slack in the membranes may be associated with larger differences in the membrane surface area versus the frame transverse cross sectional area within which the membranes are mounted. Conversely, smaller amounts of slack may be associated with smaller differences in the membrane surface area versus the frame transverse cross sectional area.

In view of the above, a surface area of one or more membranes mounted within a frame may be greater than a transverse cross sectional area of the frame within which the one or more membranes are mounted. The surface area of the one or more membranes may include portions of the membranes that are bonded together within an interior portion of the membranes disposed radially inward from, or otherwise disposed within an associated frame. Additionally, the surface area of the one or more membranes may be greater than the transverse cross sectional area of the frame by a percentage that is greater than or equal to 1%, 2%, 3%, 4%, 5%, 10%, 20%, and/or any other appropriate percentage. Correspondingly, the surface area of the one or more membranes may be greater than the transverse cross sectional area of the frame by a percentage that is less than or equal to 30%, 20%, 10%, 5%, and/or any other appropriate percentage. Combinations of the foregoing are contemplated including, for example, a surface area of the one or more membranes being greater than the transverse cross sectional area by a percentage that is between or equal to 1% and 30%. Of course percentages both greater than and less than those noted above are also contemplated as the disclosure is not limited in this fashion.

Similar to the above, a portion of one or more membranes deformed in a direction that is out of a plane of the membranes during a mounting process to a frame may be deformed by any appropriate amount to provide a desired amount of slack in the membranes once mounted to the frame. In some embodiments, this out of plane deformation may correspond to an out of plane deformation that would result in a projected two dimensional area of the membrane relative to the flat planar configuration of the membrane decreasing by a percentage that is greater than or equal to 0.3%, 0.5%, 1%, 2%, 3%, and/or any other appropriate percentage. Correspondingly, the deformation may result in a projected two dimensional area of the membrane decreasing by a percentage that is less than or equal to 7.5%, 7%, 6%, 5%, 4%, 3%, and/or any other appropriate percentage. Combinations of the foregoing are contemplated including, for example, a range that is between or equal to 0.3% and 7.5%. Further, in some embodiments, this deformation may correspond to an out of plane deformation that is between or equal to about 1 mm and 10 mm in a direction that is out of a plane of the membrane in the planar flat configuration. Of course, specific deformation ranges are expected to change for different frame and membrane sizes. In either case, ranges both greater than and less than those noted above for either the percentage of change in area and/or the absolute amount of deformation are contemplated as the disclosure is not limited in this fashion.

In certain embodiments, deforming the membranes of a device during mounting of a frame may be aided through the use of a support the stacked membranes may be disposed on during the frame mounting process. The support may extend over at least a portion, and in some instances an entire, area of the membranes disposed thereon. The specific profile of the support may be adjusted to control the degree of membrane deformation. For example, a stack of two or more membranes may be disposed on a curved support or other appropriately shaped support that may deform a stack of membranes disposed thereon in a desired manner. The curved support may also have any appropriate shape including, but not limited to, a sphere, a spherical dome, a cylinder, a partial cylinder, an ovoid, a partial ovoid, and/or any other appropriate shape capable of providing a desired deformation to a stack of membranes disposed thereon or at least partially disposed thereon. In either case, disposing the first and second membranes of a macroencapsulation device on a support may deform a portion of the stack of membranes in a direction out of a plane of the first and second membranes such that the membranes are deformed from a larger first maximum transverse dimension associated with the membranes in an undeformed planar configuration to a smaller second maximum transverse dimension associated with the membranes in a deformed state (e.g. a bent or curved configuration of the membranes). A frame may then be mounted to the membranes while they are held in the deformed configuration.

While the use of a curved support is described above for deforming a stack of membranes, the disclosure is not limited to only using curved supports. For example, in some embodiments, a method of deforming the first and second membranes from a first maximum transverse dimension to a second smaller maximum transverse dimension for mounting a frame thereon may include deforming the membranes using thermoforming, mechanical deformation, and/or any appropriate method capable of mounting a frame to the membranes in the desired configuration while maintaining at least a desired portion of the membranes extending between the frame in a flexible configuration with a desired amount of slack.

In certain embodiments, it may be desirable to retain a stack of two or more membranes in a desired position and/or orientation on an underlying support. While this may be done in any appropriate fashion, in one embodiment, a support may be configured to apply vacuum suction to one or more portions of a stack of membranes to maintain the membranes proximate the support. To avoid compaction of the diffusive portions of a macroencapsulation device, the vacuum may be applied to one or more non-diffusive portions of the membranes. For example, the non-diffusive portions of the first and second membrane may include bonded regions (e.g. a bonded perimeter and/or bonded interior portions of a first and second membrane) and/or a portion of the membranes located outside of an active region of the device, e.g. radially outwards from a bond extending around a perimeter of the device forming the device interior volume. Thus, the vacuum may be applied at locations radially outward from an internal volume disposed between the first and second membranes or other appropriate non-diffusive portions of the membranes.

As noted above, a macroencapsulation device may include multiple layers of membranes. At least one exterior membrane of these multiple layers of membranes may be semipermeable. However, embodiments in which each of the membranes is semipermeable or where at least one of the membranes within a device are substantially impermeable are also contemplated. Further, a device may include two stacked membranes, three stacked membranes, and/or any other appropriate number of membranes as the disclosure is not limited in this fashion. For example, in one embodiment including two membranes, either of one membrane may be semipermeable and the other impermeable or both may be semipermeable. Accordingly, it should be understood that the current disclosure is not limited to any particular combination of membranes within a stacked structure.

In some embodiments, a macroencapsulation device may include at least one population of cells disposed within an internal volume of the device. For example, the population of cells may be disposed within an internal volume formed between two or more opposing exterior membranes of the device where an exterior edge of the internal volume may be defined by one or more bonds extended around a perimeter of the membranes or other appropriate portion of the membranes. In such an embodiment, at least the exterior membranes of the device may be configured to block passage of the one or more populations of cells out of the device. Accordingly, the one or more populations of cells may be retained within the interior volume of the device. Of course, while the use of two exterior membranes forming a single internal volume is noted, the use of multiple intermediate membranes positioned between the exterior membranes of a device and/or multiple unconnected interior volumes within a device are also contemplated.

In addition to retaining a population of cells within an interior of a device, in some embodiments, the membranes of a device may be configured to protect the one or more populations of cells disposed in an interior of the device from an immune attack while permitting the passage of a desired biological product, such as insulin, produced by the cells as well as waste and nutrients used and produced by the cells. In some embodiments, the membranes are configured to protect the cells from an immune attack in the absence of an immune suppression therapy.

The membranes of a macroencapsulation device may be formed from any appropriate biocompatible material. The biocompatible material may be substantially inert towards cells housed within the macroencapsulation device and the surrounding tissue. The biocompatible material may comprise a synthetic polymer or a naturally occurring polymer. In some embodiments, the polymer may also be a linear polymer, a cross linked polymer, a network polymer, an addition polymer, a condensation polymer, an elastomer, a fibrous polymer, a thermoplastic polymer, a non-degradable polymer, combinations of the foregoing, and/or any other appropriate type of polymer as the disclosure is not limited in this fashion. Appropriate types of polymers may comprise polyvinylchloride (PVC), polyethylene (PE), polypropylene (PP), polymethylmetacrylate (PMMA), polystyrene (PS), polytetrafluoroethylene (PTFE), expanded polytetrafluoroethylene (ePTFE), polyurethane (PU), polyamide (nylon), polyethylenterephthalate (PET), polyethersulfone (PES), polyetherimide (PEI), polyvinylidene difluoride (PVDF), Polycaprolactone (PCL), poly(lactic-co-glycolic acid) (PLGA), poly-L-lactide (PLLA), any combination of the foregoing, and/or any other appropriate polymeric material. The synthesis methods used for forming one or more of the porous membranes from the above noted polymeric materials may include, but are not limited to, expansion, solvent-casting, immersion precipitation and phase separation, electrospinning, methods that yield isoreticular network, methods that yield trabecular network, or any other appropriate method of forming a porous polymer membrane.

Sintering of a membrane may be used to alter the porosity and flux properties of a membrane. For example, the sintering may increase the porosity of the membrane while maintaining its pore structure. The sintering may also improve the mechanical stability and diffusive flux of the membrane. Thus, sintering may be used to alter the porosity and/or mechanical properties of the membranes, which in turn can be used to tune the porosity and the flux properties of the macroencapsulation device. Accordingly, in some embodiments, any desired combination of sintered and/or unsintered membranes may be used. For instance, two exterior membranes of a device may be bonded together where either a sintered and unsintered membrane are bonded together, two sintered membranes are bonded together, or two unsintered membranes are bonded together. Further, any number of intermediate membranes positioned between these exterior membranes may be used where these intermediate membranes may be sintered or unsintered.

The membranes of a macroencapsulation device as described herein may be made from porous membrane materials that are configured to allow for transport through the membranes of materials, such as a biological product, with a molecular weight less than about 3000 kDa, 2000 kDa, 1000 kDa, 500 kDa, 400 kDa, 300 kDa, 200 kDa, 100 kDa, 50 kDa, 40 kDa, 30 kDa, 20 kDa, 10 kDa, 6 kDa, 5 kDa, 4 kDa, 3 kDa, 2 kDa, 1 kDa, and/or any other appropriate range of molecular weights depending on the desired application. For example, the one or more membranes of a macroencapsulation device may be configured to permit the flow of insulin through the membranes which has a molecular weight of about 5.8 kDa.

To provide the desired selectivity, the porous membranes used with the macroencapsulation devices disclosed herein may have an open porous structure with average pore sizes that are greater than or equal to about 1 nm, 5 nm, 10 nm, 15 nm, 20 nm, 30 nm, 40 nm, 50 nm, 60 nm, 70 nm, 80 nm, 90 nm, 100 nm, 200 nm, 300 nm, and/or any other appropriate size range. Correspondingly, the average pore size of the various membranes described herein may have an average pore size that is less than or equal to 2500 nm, 2000 nm, 1700 nm, 1500 nm, 1400 nm, 1300 nm, 1200 nm, 1100 nm, 1000 nm, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, and/or any other appropriate size range. Combinations of the foregoing are contemplated including, for example, an average pore size that is between or equal to 1 nm and 20 nm, 1 nm and 2500 nm, and/or any other appropriate combination. Of course, while specific average pore sizes are described above, it should be understood that any appropriate average pore size may be used for the various membranes described herein including average pore sizes both greater than and less than those noted above.

To provide sufficient strength and/or rigidity for a macroencapsulation device, the various membranes and frames may be made from materials that are sufficiently stiff. The desired stiffness may be provided via an appropriate combination of a materials Young's modulus, thickness, and overall construction which may be balanced with a desired permeability of the device. Appropriate Young's moduli for the various membranes and frames described herein may be at least $10^5$ Pa, $10^6$ Pa, $10^7$ Pa, $10^8$ Pa, $10^9$ Pa, $10^{10}$ Pa, and/or any other appropriate moduli both greater than and less than these ranges. Of course ranges between the foregoing Young's moduli are contemplated including, for example, a Young's modulus between or equal to about $10^6$ Pa and $10^{10}$ Pa.

In some embodiments, it may be desirable for one or more of the membranes included within a macroencapsulation device to be hydrophilic to facilitate loading of cells into the macroencapsulation device and/or to facilitate the flow of one or more fluids, biological compounds, therapeutics, cell nutrients, cell waste, and/or other materials through the membranes of a device. Additionally, a hydrophilic outer membrane may also reduce the occurrence of fibrosis when the device is positioned in vivo. Accordingly, the membranes of a macroencapsulation device may either be made from a hydrophilic material and/or treated with a hydrophilic coating. Appropriate hydrophilic materials may include, but are not limited to an appropriate hydrophilic polymer, polyethylene glycol, polyvinyl alcohol, polydopanine, any combination thereof, and/or any other appropriate hydrophilic material capable of forming a coating on the membranes or that the membranes may be made from.

The membranes described in the various embodiments of macroencapsulation devices described herein may be bonded to one another using any appropriate bonding method as the disclosure is not limited in this fashion. For example, adjacent membranes may be bonded to one another using an adhesive, an epoxy, a weld or other fusion based technique (e.g. ultrasonic bonding, laser bonding, physical bonding, thermal bonding, etc.), mechanical clamping using a frame or fixture, and/or any other appropriate bonding method. In one specific embodiment, adjacent membranes may be bonded using a heated tool that is used to press or strike two or more membranes against each other for a set fusion time with a predetermined pressure and/or force. In view of the above, it should be understood that the current disclosure is not limited to the use of any particular method for bonding the membranes together.

In some embodiments, one or more thermal treatments may be applied to a stack of bonded membranes after the membranes have been bonded to each other, and in some instances after a frame has been attached to the membranes. For example, the membranes may be bonded together with a bond extending along a perimeter of the membranes and/or one or more bonds may be formed within an interior area of the membranes (e.g. within the bonded perimeter) prior to heat treatment of the membranes. This post bonding heat treatment may provide enhanced bonding of the membranes at the bonded regions. The specific heat treatment temperatures and durations to improve the bonding between the membranes may vary depending on the specific materials used. However, in some embodiments the heat treatment temperature may be between a glass transition temperature and a melting temperature of a polymer membrane.

In certain embodiments, it may be desirable to limit a maximum thickness of a macroencapsulation device in a direction perpendicular to a plane in which a maximum transverse dimension of the device lies. Accordingly, one or more interior portions of first and second membranes disposed within a frame may be bonded together to limit the extent to which the membranes may be displaced relative to one another. These bonded portions of the membranes may be dispersed uniformly within the interior portion of the membranes located within the frame. These bonded portions may have any appropriate shape including, for example, dots, lines, curves, or any other appropriate shape. While the bonded interior portions may have any appropriate size for a desired application, in one embodiment using bonded dots, the diameter of the bonded dots may be greater than or equal to about 0.5 mm, 0.75 mm, 1 mm, 1.25 mm, 1.5 mm, and/or any other appropriate diameter. Correspondingly, the diameter of the dots may be less than or equal to about 3 mm, 2.75 mm, 2.5 mm, 2.25 mm, 2.0 mm, and/or any other appropriate diameter. Combinations of the above noted ranges are contemplated including, for example, a diameter that is between or equal to 0.5 mm and 3 mm. While specific shapes and size ranges are provided above, it should be understood that other shapes and sizes both smaller and greater than those noted above are contemplated as the disclosure is not limited in this fashion.

In some embodiments, it may be desirable to improve the vascularization of a macroencapsulation device. Accordingly, in certain embodiments, one or more through holes may be formed in the one or more bonded portions located within an interior portion of the membranes disposed radially inwards from a frame of the device. These through holes may permit vasculature to growth through the through holes in addition to growing around the upper and lower surfaces of the device. The one or more through holes may be formed in the bonded portions of the membranes using laser ablation, mechanical puncture, cutting, or any other appropriate method of forming a through hole in the one or more bonded portions of the membranes.

In some embodiments, the above noted bonded portions within an interior area of the device, and the corresponding through holes, may be formed prior to mounting a frame on the device while the membranes are located in a flat planar configuration. This may simplify the manufacturing process when dealing with flexible membranes mounted to a frame with a desired amount of slack which may complicate forming other features after being mounted to the frame.

As elaborated on below, in some embodiments, one or more portions of adjacent membranes may be bonded together such that the interior volume within the device is subdivided into a plurality of interconnected channels, which in some embodiments may be shaped like a lumen though any appropriate shape or configuration of the channels may also be used. The channels may have an inner maximum transverse dimension, such as an inner diameter, that is greater than or equal to 40 µm, 50 µm, 100 µm, 200 µm, 300 µm, 400 µm, and/or any other appropriate dimension. Correspondingly, the channels may have an inner maximum transverse dimension that is less than or equal to 800 µm, 700 µm, 600 µm, 500 µm, 400 m, and/or any other appropriate dimension. Combinations of the foregoing are contemplated including, for example, an inner maximum transverse dimension of the plurality of channels that is between or equal to 40 µm and 800 µm. Further, a density of the interconnected channels forming the various compartments of a device may have a density per unity area within a transverse plane of the device that is be greater than or equal to about 10 channels/cm$^2$, 15 channels/cm$^2$, 20 channels/cm$^2$, 25 channels/cm$^2$, 30 channels/cm$^2$, 35 channels/cm$^2$, 40 channels/cm$^2$, 45 channels/cm$^2$, 50 channels/cm$^2$, 60 channels/cm$^2$, 70 channels/cm$^2$, 80 channels/cm$^2$, 90 channels/cm$^2$, 100 channels/cm$^2$, 110 channels/cm$^2$, 120 channels/cm$^2$, 130 channels/cm$^2$, 140 channels/cm$^2$, 150 channels/cm$^2$, 175 channels/cm2, or 200 channels/cm$^2$. Ranges extending between any of the above noted density of channels are also contemplated including, for example, a density of channels that is between or equal to about 10 channels/cm$^2$ and 200 channels/cm$^2$. Though densities both greater than and less than the ranges described above are also contemplated.

A macroencapsulation device as described herein may have any appropriate combination of internal volumes, external dimensions, and/or other appropriate physical parameter. For example, an internal volume encompassed by the outer membranes of a macroencapsulation device may be between or equal to 40 µL and 250 µL. A width, or maximum transverse dimension, of the macroencapsulation device may also be between about 20 mm and 80 mm. Additionally, to provide a desired diffusion of oxygen into the interior of a macroencapsulation device to support cells contained therein, a maximum oxygen diffusion distance from an exterior of the device to an interior portion of the device including a population of cells may be less than 50 µm, 100 µm, 150 µm, 200 µm, 250 µm, 300 µm, 350 µm, 400 µm, 450 µm, or 500 µm. Correspondingly, a maximum thickness, or dimension perpendicular to a maximum transverse dimension, of the overall device and/or an internal volume located within the device may be less than 50 µm, 100 µm, 150 µm, 200 µm, 250 µm, 300 µm, 350 µm, 400 µm, 450 µm, or 500 µm. Further, in some embodiments, an outer surface area to volume ratio of the device may be greater than or equal to about 20 cm$^{-1}$, 40 cm$^{-1}$, 60 cm$^{-1}$, 80 cm$^{-1}$, 100 cm$^{-1}$, 120 cm$^{-1}$, or 150 cm$^{-1}$. Ranges extending between any of the forgoing values for the various dimensions and parameters as well as ranges both greater than and less those noted above are also contemplated.

While specific dimensions, parameters, and relationships related to the macroencapsulation device and the materials it is made from are described above, it should be understood that dimensions, parameters, and relationships both greater than and less than those noted above are contemplated as the disclosure is not limited in this fashion. Accordingly, any appropriate combination of size, construction, material properties, and/or relative performance parameters may be used for a device depending on the desired application.

In some embodiments, a cell population contained within an interior volume of a macroencapsulation device may be an insulin secreting cell population. In some embodiments, the cell population comprises at least one cell derived from a stem cell derived cell. In some embodiments, at least one cell is a genetically modified cell. In some cases, at least one cell is genetically engineered to reduce an immune response in a subject upon implantation of the device, as compared to comparable cells that are not genetically engineered. In some embodiments, the cell population is a stem cell derived cell that is capable of glucose-stimulated insulin secretion (GSIS). For example, an appropriate population of cells may comprise pancreatic progenitor cells, endocrine cells, beta cells, a matrix including one or more of the foregoing, or any combination thereof. Further, a matrix may comprise isolated islet cells, isolated cells from pancreas, isolated cells from a tissue, stem cells, stem cell-derived cells, induced pluripotent cells, differentiated cells, transformed cells, or expression systems, which can synthesize one or more biological products. Optionally, in some embodiments, the matrix may comprise a second type of cells that support the first type of cells that synthesize one or more biological products. In some embodiments, the cells may be encapsulated before being placed within the matrix. In such an embodiment, the cells may be encapsulated in a microcapsule or may be conformally coated. However, naked, i.e. uncoated, cells may also be used.

Depending on the particular embodiment, a therapeutically effective density of cells may be loaded into the interior volume of a macroencapsulation device. Appropriate cell densities disposed within an interior volume may be greater than or equal to about 1000 cells/µL, 10,000 cells/µL, 50,000 cells/µL, 100,000 cells/µL, 500,000 and/or any other appropriate cell density. Appropriate cell densities disposed within the compartment may also be less than or equal to about 1,000,000 cells/µL, 500,000 cells/µL, 100,000 cells/µL, 50,000 cells/µL, 10,000 cells/µL, and/or any other appropriate cell density. Combinations of the foregoing are contemplated including cell densities between about 1000 cells/µL and 1,000,000 cells/µL. Of course, cell densities both greater than and less than those noted above may also be used depending on the desired application and cell types being used.

The macroencapsulation devices described herein may be implanted in a subject in vivo at various sites. In one example, a device may be implanted in a subject by properitoneal or retrorectus implantation. In other examples, the device can be placed by intra-omental implantation. In another example, the device can be placed by subcutaneous implantation. In another example, the device can be placed by suprahepatic implantation. In some instances, the macroencapsulation devices described herein may be fixed in vivo at an implantation site using any appropriate fixation method including, for example, the application of a tissue adhesive. Appropriate tissue adhesives may include, but are not limited to, fibrin, cyanoacrylate, polyethylene glycol, albumin-based adhesive, polymer-based adhesive, and/or any other appropriate adhesive. In another example, the device may be fixed using platelet-rich plasma and/or any other appropriate fixation method as the disclosure is not limited in this fashion.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein. For the sake of clarity, the figures are described in relation to methods and devices including just a first and second outer membrane bonded to one another. However, it should be understood that the methods and devices described in relation to the figures may include any number of intermediate membranes disposed between these outer membranes as the disclosure is not limited in this fashion.

FIGS. 1A-1H depict one embodiment of a process for bonding two or more membranes together and forming various other features on the membranes prior to mounting a frame to the membranes.

Figure 1B:
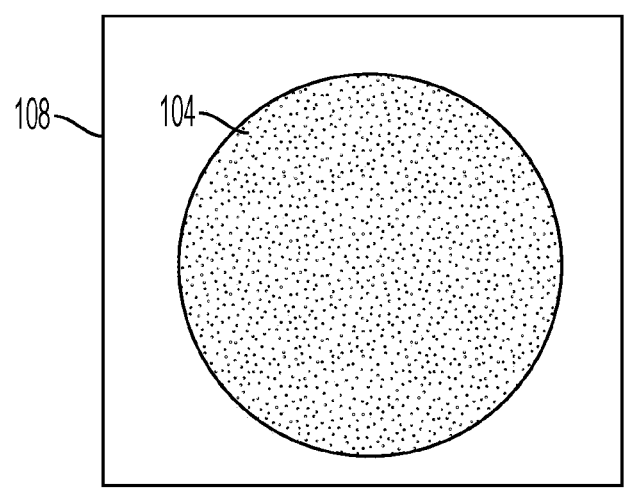
FIG. 1B shows a top view of FIG. 1A.

As shown in FIGS. 1A-1B, a first membrane 102 is disposed on a lower portion of a fixture 106 such that the first membrane 102 is disposed either directly, or indirectly, on a surface of the lower portion of the fixture. A second membrane 104 is disposed on a surface of the first membrane 102 opposite the lower portion of the fixture. In some embodiments, the lower portion of the fixture may include one or more sensors 110 distributed across a surface of the lower portion of the fixture the membranes are disposed on. These sensors may be configured to sense a force, pressure, and/or temperature applied to corresponding portions of the first and second membranes.

Once the first membrane 102 and the second membrane 104 are appropriately positioned on the lower portion 106 of the fixture, an upper portion 108 of the fixture may be brought into contact with one or more portions of the second membrane such that both the first membrane 102 and the second membrane 104 are clamped, or otherwise held in place, between the upper and lower portions of the fixture. In the depicted embodiment, the first and second membranes are held in a substantially planar configuration on a planar surface of the lower fixture. However, embodiments in which the membranes are held in a different configuration during an initial formation step are also contemplated. As also illustrated in the figures, the upper portion of the fixture 108 includes an opening, or other arrangement, that leaves a central portion of the stacked first and second membranes uncovered or otherwise exposed for further processing. Thus, the lower and upper portions of the fixture may be configured to clamp one or more peripheral portions of the first and second membranes located radially outward from a central uncovered portion of the membranes intended to form a portion of a macroencapsulation device. This arrangement of an exposed central portion of the membranes is best illustrated in FIG. 1B. While a circular opening in the top portion of the fixture has been illustrated in the figures it should be understood that the current disclosure is not limited to any particular shape of the exposed portions of the membranes and/or how the membranes are held in place during a bonding and initial formation process.

Figure 1C:
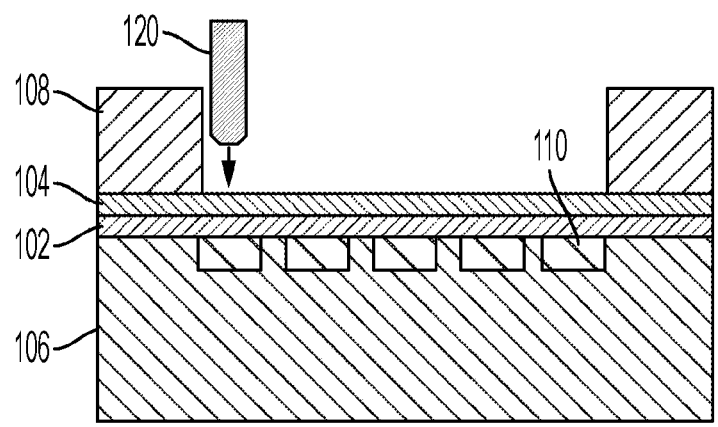
FIG. 1C shows a process of bonding a portion of the first and second membranes in the fixture according to one embodiment.
Figure 1D:
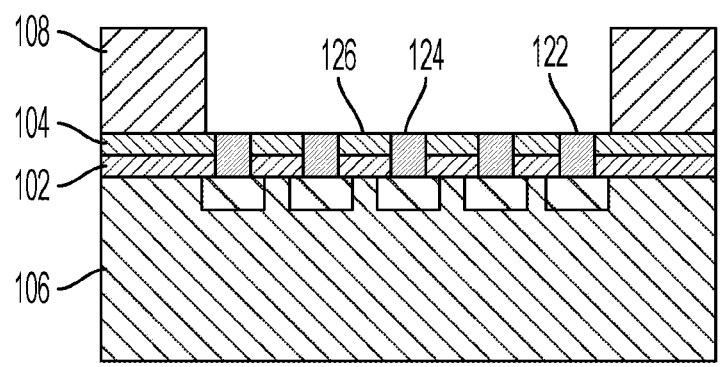
FIG. 1D. shows the membranes in the fixture after bonding according to one embodiment.
Figure 1E:
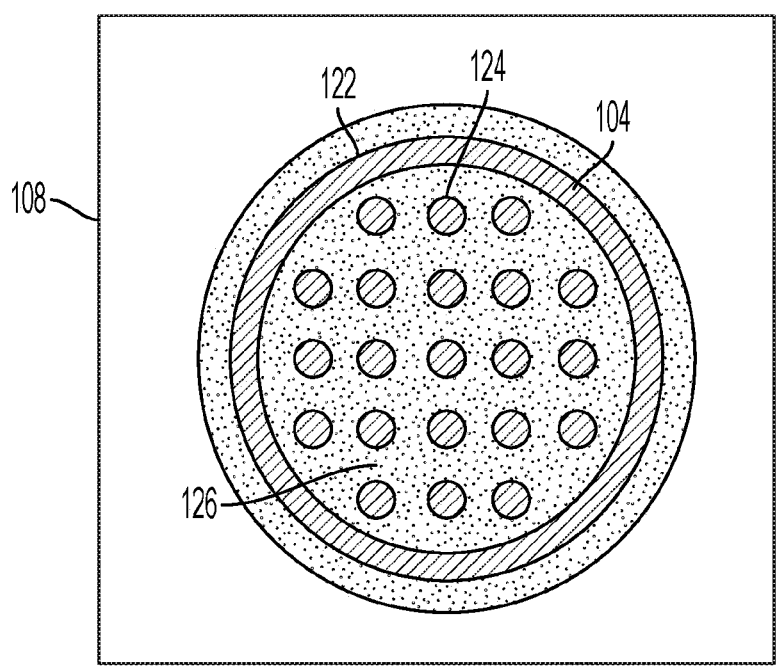
FIG. 1E. shows a top view of FIG. 1D.
Figure 1F:
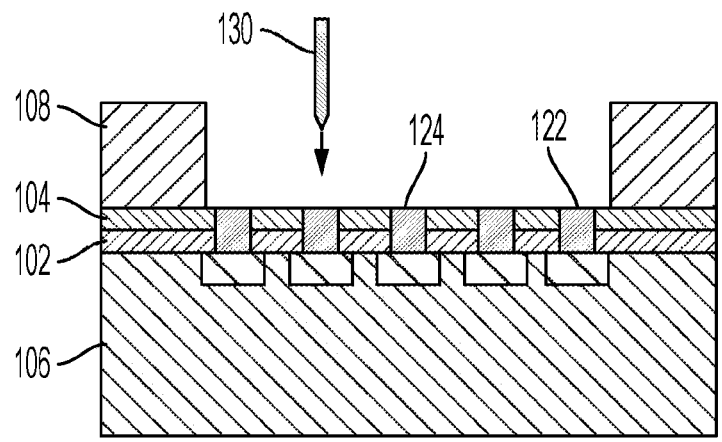
FIG. 1F shows a process of introducing through holes in the membranes while positioned in the fixture according to one embodiment.
Figure 1G:
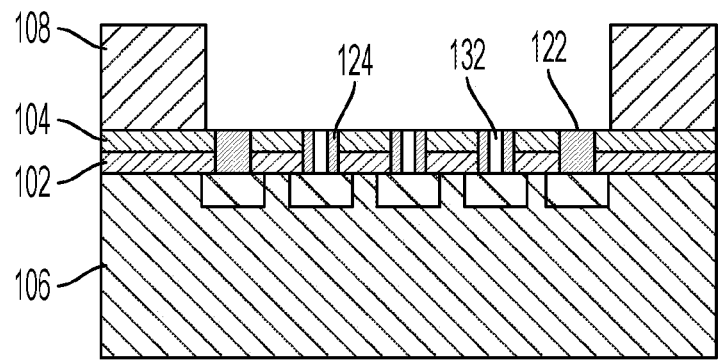
FIG. 1G shows the resulting through holes formed in the membranes of FIG. 1F.

After positioning the first membrane 102 and second membrane 104 in a fixture, the membranes may undergo a number of different processes including bonding in one or more locations. FIGS. 1C-1E illustrate one embodiment of a bonding process of the first and second membranes to each other. Referring to FIG. 1C, a bonding tool 120 is used to bond the first and second membranes together in a desired location. In one specific embodiment, the bonding tool may include a heated tip that is positioned at a desired location on a top surface of the second membrane and pressed in a downward direction with a predetermined temperature and force for a predetermined duration to form a bond between the two membranes. The previously noted one or more sensors 110 distributed around a surface of the lower portion of the fixture 106 may communicate signals to an associated processor, not depicted, to implement feedback control of the bonding process. Once a bond is formed in a desired location, the bonding tool may be moved to an adjacent portion of the membranes that at least partially overlaps with a portion of the already formed bond until a desired shape and size of a particular bond is formed, though different bonding methods may also be used as previously described. The tool may then move on to forming any number of other bonds between the two membranes in any number of desired locations with any number of desired patterns dependent on the particular application. For example, as shown in FIGS. 1D and 1E, the first membrane and the second membrane may be bonded along a perimeter 122 of an active portion of the membranes intended to form an internal volume there between.

As best shown in the top view of FIG. 1E, in some embodiments, a bonding tool may also be used to bond one or more portions 124 of the membranes located radially inward from the resulting bonded perimeter 122. In this particular embodiment these bonded portions located within the bonded perimeter 122 may take the form of bonded dots distributed across a surface area of the membranes. However, any appropriate shape and/or configuration of these bonded regions may also be used. Due to the presence of these bonded regions located radially inwards from a bonded perimeter of the membranes, an internal volume formed between the membranes, once in the filtered configuration, may take the form of a plurality of interconnected channels 126 corresponding to the unbonded regions of the membranes extending between these bonded portions.

In some instances, the bonded portions of the membranes 102 and 104 may have a substantially lower membrane permeability due to the bonding process such that they may be considered non-diffusive portions of the membranes. This may include both the bonded perimeter 122 and the interior bonded portions 124 of the membranes located radially inwards from the bonded perimeter. In contrast, the unbonded portions of the membranes, such as the channels 126 in the depicted embodiment, may be considered diffusive portions of the membranes where the permeabilities of the membranes may be significantly higher than the non-diffusive portions, and in some embodiments may be substantially unaltered from the parent membrane materials. In addition to the bonded portions of the membranes being considered non-diffusive portions of the membranes, portions of the membranes located radially outward from the bonded perimeter 122, and that would not be in direct fluid communication with the resulting interior volume formed there between, may also be considered a non-diffusive portion of the membranes for purposes of this description.

In some embodiments, after bonding portions of the first and second membranes 102 and 104 together, one or more through holes 132 may be formed in one or more of the bonded portions 122 and 124. For example, referring to FIGS. 1F-1G, a device such as a laser, punch, cutter, or other appropriate device may be used to form through holes 132 in one or more of the bonded portions of the first membrane 102 and the second membrane 104. In one specific embodiment, the through holes may be formed via laser ablation where the laser removes a bonded portion of the first and the second membranes while leaving a surrounding bonded portion of the membranes to function as a seal between an interior volume formed by the membranes and an exterior of the device.

Figure 1H:
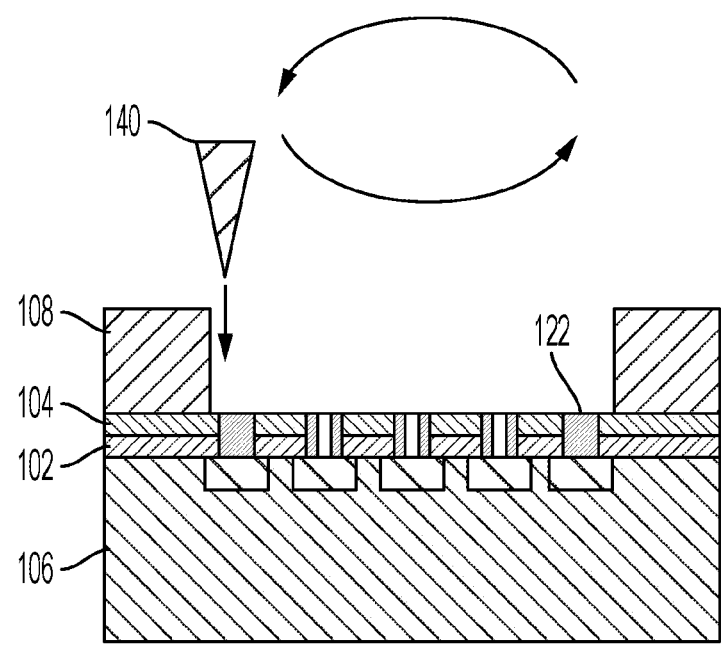
FIG. 1H shows a process of cutting out a portion of the bonded membranes while in the fixture according to one embodiment.

In instances where an outer shape and size of the bonded membranes is already in a final desired configuration, the bonded membranes may simply move onto the next step of the manufacturing process. Alternatively, in some embodiments, one or more peripheral portions of the membranes may be cut off of the membranes to provide a desired size and/or shape for the bonded membranes. One embodiment of such a process is illustrated in FIG. 1H, where a blade 140, or other cutting implement, may be used to form a cut extending around the bonded perimeter 122 of the membranes. In the depicted embodiment, the blade is extended through the first and second membranes and then moved relative to the membranes along any desired cutting profile around the bonded perimeter of the membranes to cut off one or more peripheral portions of the membranes held in the fixture and located radially outwards from the bonded perimeter. Of course, while the figures have depicted a blade being moved relative to membranes held within a fixture, any appropriate method of cutting off the peripheral regions of the bonded membranes to provide a desired size and shape of the bonded membranes may be used as the disclosure is not limited in this fashion.

Figure 1I:
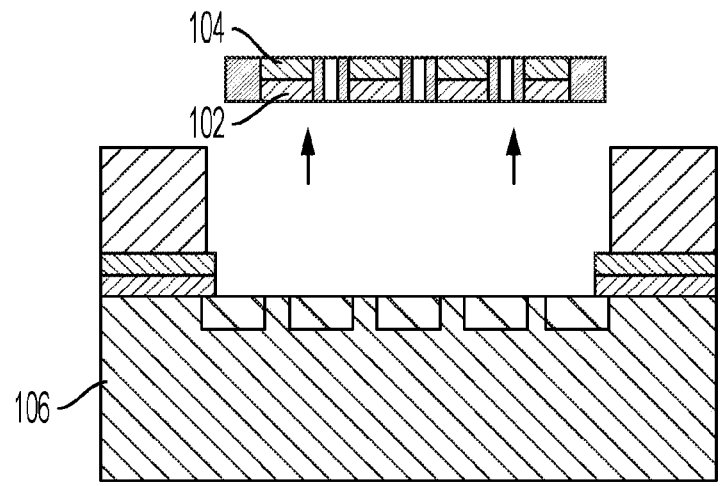
FIG. 1I shows a process of removing a cut out portion of the membranes from the fixture according to one embodiment.

Regardless of whether or not a cutting process is performed, after bonding the various desired portions of the membranes 102 and 104 together, the bonded membranes may be removed from the fixture corresponding to upper and lower fixture portions 106 and 108 as shown in FIG. 1I. This may be done in any number of ways including simply opening the fixture and manually removing the bonded membranes. Alternatively, a system may automatically pick up the membrane and remove it from the fixture. For example, a system may apply a vacuum to one or more non-diffusive portions of the bonded membranes to lift it off of the surface of the fixture. However, any appropriate method of removing the bonded membranes from a fixture or other device may be used as the disclosure is not limited in this fashion.

Figure 1J:
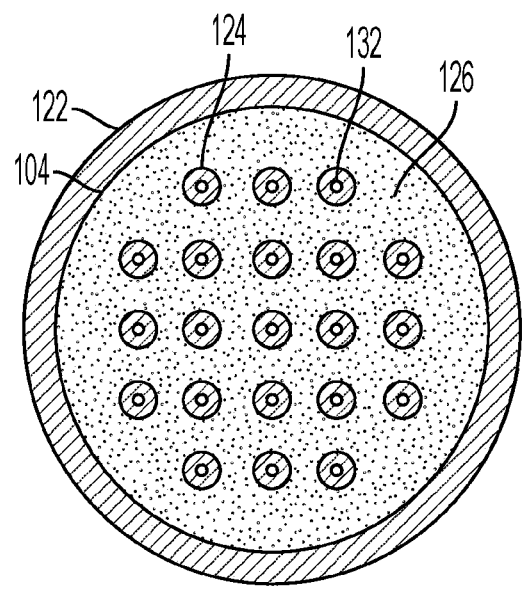
FIG. 1J shows a top view of the removed membranes from FIG. 1I.

A top view of the resulting bonded stack of membranes is illustrated in FIG. 1J. In the figure, a top surface of the second membrane 104 is shown with a bonded perimeter 122 of the membranes (e.g., where first and the second membranes are bonded) extending around a perimeter of the bonded membranes. While the bonded perimeter has been shown as extending up to an exterior edge of the membranes, embodiments in which a bond extending along a perimeter of the membranes is inset from an exterior edge of the membranes are also contemplated. The bonded membranes also include one or more bonded portions 124 that are located radially inwards from the bonded perimeter. Additionally, through holes 132 may be formed in the one or more bonded portions where the through holes extends from an exterior surface of the first membrane to an opposing exterior surface of the second membrane. Due to the presence of the bonded portions of the membranes located radially inwards from the perimeter bond, an internal volume formed between the first and second membranes may be formed into a plurality of interconnected channels 126 corresponding to the un-bonded portions of the membranes.

In some embodiments, after bonding the membranes together (e.g. bonding of the perimeter and/or interior portions of the first membrane and the second), the first membrane and the second membrane may be coated with a hydrophilic material and/or subjected to other treatments which may not be compatible with the bonding process. This may include various high temperature treatments where the bonded membranes may be subjected to various thermal treatments which may enhance the bonding of the membranes in some embodiments.

In some embodiments, a prebonded stack of membranes, such as the bonded first and second membranes described above, may be mounted to a frame. Alternatively, in some embodiments, a perimeter of a stack of membranes may be bonded together and attached to a frame at the same time. In either case, a method for mounting the membranes to a frame to provide a desired amount of slack in the membranes once mounted may be used. One such embodiment is described in further detail below in relation to FIGS. 2A-2E.

Figure 2A:
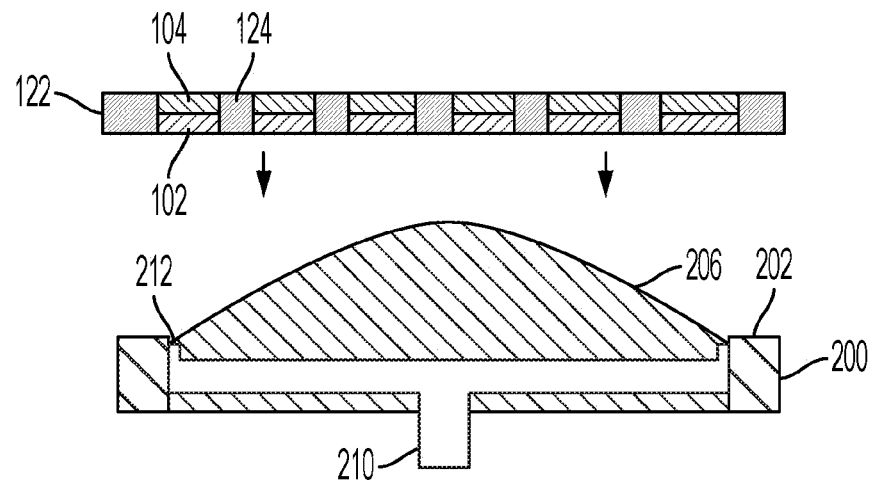
FIG. 2A shows a process of positioning a stack of membranes onto a curved support according to one embodiment.
Figure 2B:
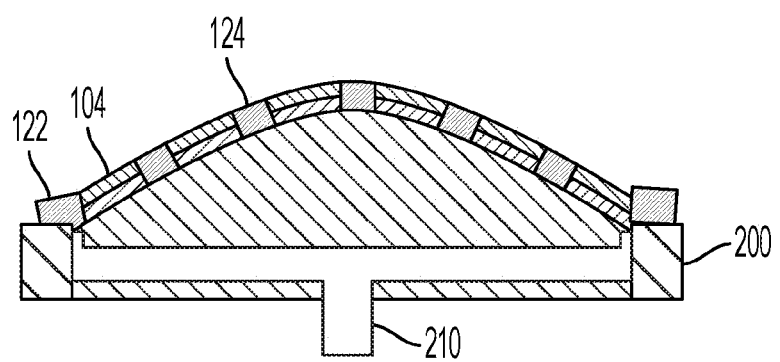
FIG. 2B shows the stack of membranes disposed on the curved support according to one embodiment.

FIGS. 2A-2B illustrate the concept of deforming a first and second membrane 102 and 104 from a first maximum transverse dimension before mounting (e.g., where the membranes are in a relatively flat planar configuration in FIG. 2A) to a second maximum transverse dimension after (e.g., where the membrane are deformed to conform to a shape of an underlying support 200 in FIG. 2B). Specifically, a surface of the first membrane opposite the second membrane may be placed onto and conforms with the shape of a curved surface 206 of the support 200 such that a portion of the first membrane and the second membrane is deformed in a direction out of a plane of the first and second membranes. For example, an outer perimeter of the first and second membranes is deformed from a first transverse dimension in the planar configuration in FIG. 2A to a smaller transverse dimension in FIG. 2B due to a central portion of the membranes being deformed in a direction out of plane of the membranes by the underlying curved surface of the support. In some embodiments, the curved surface of the support is a spherical dome as illustrated in FIGS. 2A-2E. However, embodiments in which a support with a different shape is used are also contemplated.

In some embodiments, a support 200 may include one or more ridges 202 disposed near an edge of a curved surface 206 of the support 200 supporting a stack of membranes 102 and 104 thereon. These ridges may be disposed at a plurality of locations around a perimeter of the support such that the first and second membranes 102 and 104 disposed on the curved support 200 flare out near the outer perimeter and/or are otherwise deformed as noted above two accommodate the presence of excess membrane material at these locations. A specific example of these ridges and their interaction with a membrane disposed thereon is described in further detail below in regards to FIGS. 5A-6B. That said, in the depicted embodiment a bonded stack of membranes, including the first and second membranes 102 and 104, is disposed on the support 200 where an outer perimeter of the first and second membrane is in contact with the ridges 202 to deform the portions of the membranes adjacent to the curved surface of the support. In the depicted embodiment, the ridges may help to deform portions of the membranes by forming wrinkles, pleats, corrugations, folds, or otherwise deforming the membranes in this location to accommodate the excess material being forced into a smaller area when the membranes are deformed from a larger first transverse dimension (e.g. the planar configuration) to a smaller second transverse dimension (e.g. the deformed configuration disposed on the support).

While the use of ridges have been illustrated in the above embodiment, it should be understood that any method of deforming one or more locations around a perimeter of the bonded membranes from a first larger area to a second smaller area may be used.

In some instances, it may be desirable to maintain an orientation and/or position of a stack of membranes on a support during the mounting of a frame thereto. Accordingly in some embodiments, and as shown in the figures, a vacuum may be applied to one or more non-diffusive portions of the first and second membranes to maintain the first and second membranes proximate the curved support. For example, referring to FIG. 2B, the curved support 200 may include a vacuum chamber 210 that is connected to a vacuum source, not shown, to provide a negative pressure. The vacuum chamber may be fluidly connected to one or more vacuum holes 212 disposed on a surface of the curved support 200. While the vacuum holes may be located at any desired portion of the support's surface, in some embodiments, the vacuum holes may be located on portions of the support's surface where a corresponding non-diffusive portion of the bonded membranes may be located including, for example, the bonded perimeter 122 of the membranes, a portion of the membranes located radially outwards from the bonded perimeter, the bonded portions 124 of the membranes located within the bonded perimeter, and/or any other appropriate portion of the membranes. For example, a plurality of vacuum holes may be located adjacent to, or at, the ridges 202 around a perimeter of the curved surface 206 of the support. Of course other methods of maintaining a position and/or orientation of the membranes relative to the underlying support may be used including, but not limited to, mechanical fixation, clamping, temporary adhesives, and/or any other appropriate temporary fixation method.

Figure 2C:
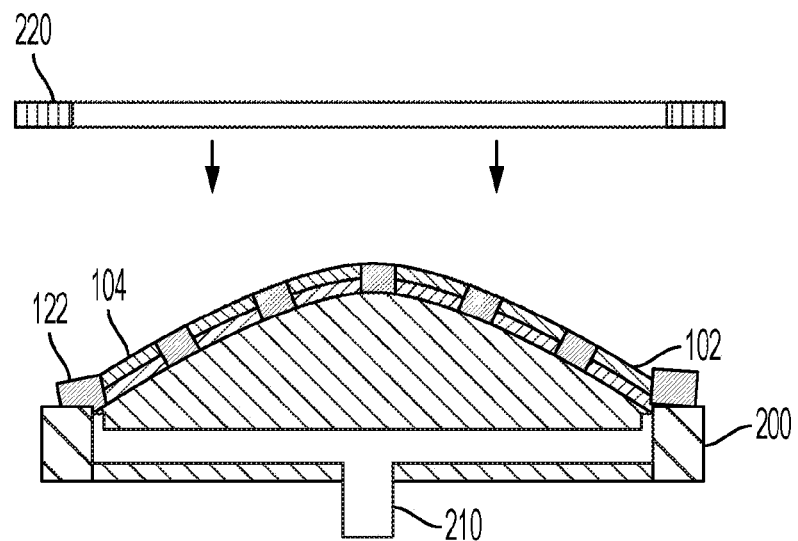
FIG. 2C shows a process of positioning a frame on the stack of membranes after positioning on the curved support according to one embodiment.
Figure 2D:
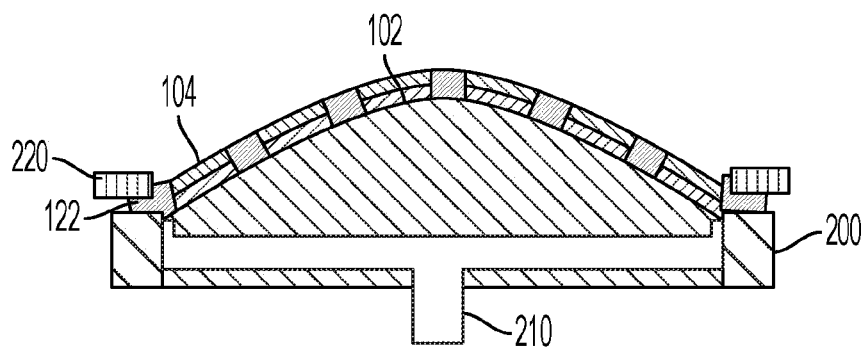
FIG. 2D shows the frame disposed on a surface of a second membrane after being positioned on the stack of membranes according to one embodiment.

After deforming the first and second membranes 102 and 104 from a first maximum transverse dimension to a smaller second maximum transverse dimension, a frame 220 may be mounted to the membranes as shown in FIGS. 2C and 2D. Specifically, a frame 220 (e.g., a perimeter frame) may be placed onto the stacked membranes while the central portion of the membranes is deformed out of plane by the underlying curved support 200. The frame may extend around at least a portion, and in some embodiments around an entire, perimeter of the bonded membranes. The size and shape of the frame may be selected to maintain a maximum transverse dimension of the membranes at the smaller second maximum transverse dimension after mounting where the maximum transverse dimension may be measured in a plane in which the planar frame extends. For example, the maximum transverse dimension in the depicted embodiment may correspond to a diameter of the circular frame placed onto the bonded membranes. However, embodiments in which frames and membranes with different shapes and sizes are used are also contemplated.

As noted above, in certain embodiments, a frame 220 may extend along at least a portion of a perimeter of the bonded membranes 102 and 104. To avoid reducing an active diffusive area of the bonded membranes, at least a portion, and in some instances, the entire frame may either be aligned with the bonded perimeter 122 of the membranes and/or positioned radially outward from the bonded perimeter. This may avoid the frame from being disposed on top of a diffusive portion of the bonded membranes which would block diffusion through underlying portions of the membranes. Accordingly, the frame may have an equal or slightly larger transverse dimension than a bond extending along a perimeter of the membranes to form an internal volume of the membranes. For example, referring to FIG. 2D, the frame 220 overlaps with only a portion of the bonded perimeter 122 of the membrane. Of course, while the membranes do not extend past the frame in the depicted embodiment, embodiments in which the frame extends past this bond into a region located radially inwards from the bonded perimeter are also contemplated.

Figure 2E:
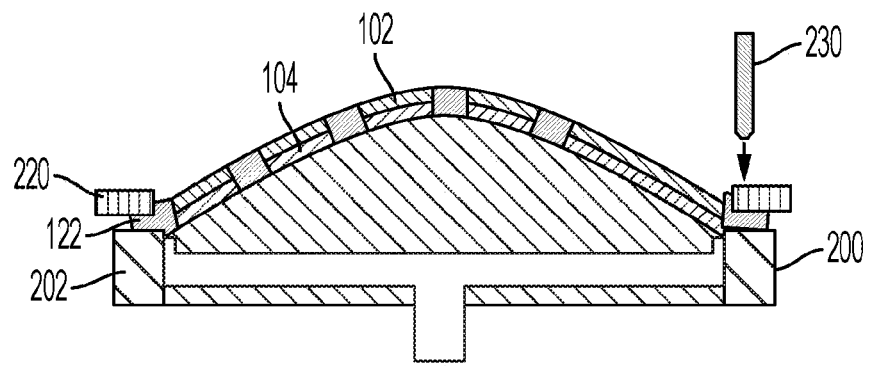
FIG. 2E shows a process of bonding the frame to the second membrane according to one embodiment.

As shown in FIG. 2E, after positioning a frame 220 on a bonded stack of membranes 102 and 104, the frame may bonded to the membranes. In certain embodiments, an adhesive, heat staking, welding (thermal, ultrasonic, etc.), mechanical fixation, or another appropriate method may be used to bond the frame and membranes at a plurality of locations around a circumference of the frame. For example, the frame and membranes may be bonded together at each of the locations where the frame and membranes contact the ridges 202 disposed around a circumference of the curved surface 206 of the support 200. In the depicted embodiment, a fixation device 230 may be used to create adhesion points between the frame and a portion of the first and second membranes at the one or more desired locations. The fixation device 230 may correspond to a combination of a port used to dispense a curable adhesive and a light source that may be used to cure the adhesive once positioned on the frame and membranes. The duration of bonding and viscosity of the adhesive may be selected to avoid excessive wicking of the adhesive into the diffusive portions of the membranes. Additionally, while a particular bonding method has been described other appropriate types of bonding may be used as noted above. After bonding the frame to the membranes, the resulting macroencapsulation device including the frame and mounted membranes may be removed from the curved support. After this initial fixation of the membranes to the frame, additional processing of the mounted frame and membranes may then be done including, for example, plane additional adhesive between the mounted frame and membranes to improve a bond there between.

Figure 3:
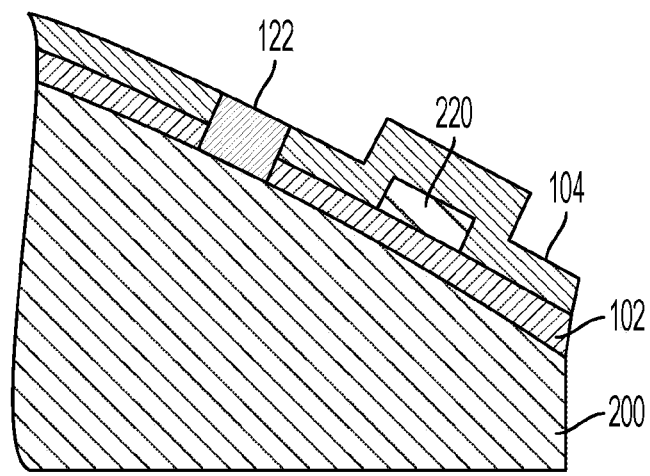
FIG. 3 shows a frame positioned between first and the second membranes according to one embodiment.

In the above embodiments, a frame is connected to an exterior surface of a second membrane 104 opposite from a first membrane 102 resting on a support 220. However, as shown in FIG. 3, embodiments in which a frame 220 is disposed between the first membrane 102 and second membrane 104 are also contemplated. In such an embodiment, portions of the first and second membranes extending radially outward from a bond 122 extending along a perimeter of the membranes may be opened and the frame may be positioned between the membranes at a location disposed radially outward from the perimeter bond of the membranes. The first and second membranes may then be bonded to the frame using any appropriate bonding method as described previously. While a particular angular orientation of the frame, membranes, and underlying support has been depicted in the figures, it should be understood that any appropriate orientation of these components may be used as the disclosure is not limited in this fashion. In either case, the frame may still function to maintain a desired transverse dimension of the membranes once removed from the underlying support.

Figure 4A:
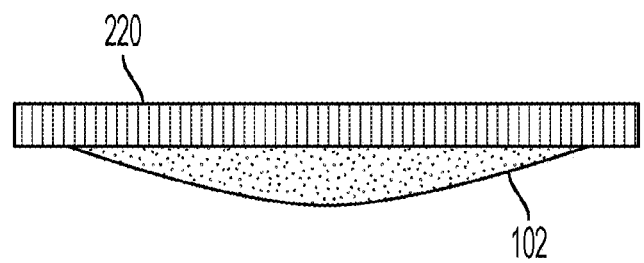
FIG. 4A shows a side view of a macroencapsulation device prior to loading according to one embodiment.
Figure 4B:
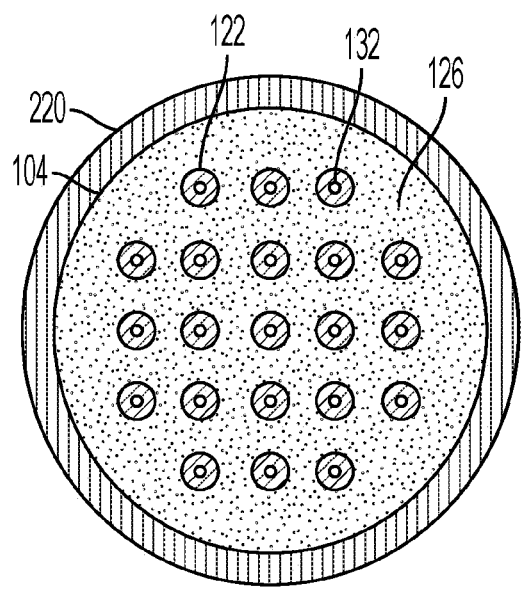
FIG. 4B shows a top view of the macroencapsulation device of FIG. 4A.
Figure 4C:
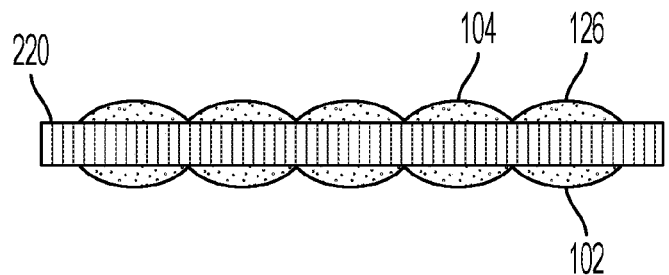
FIG. 4C shows a side view of the macroencapsulation device of FIG. 4A after loading with a desired material.
Figure 5A:
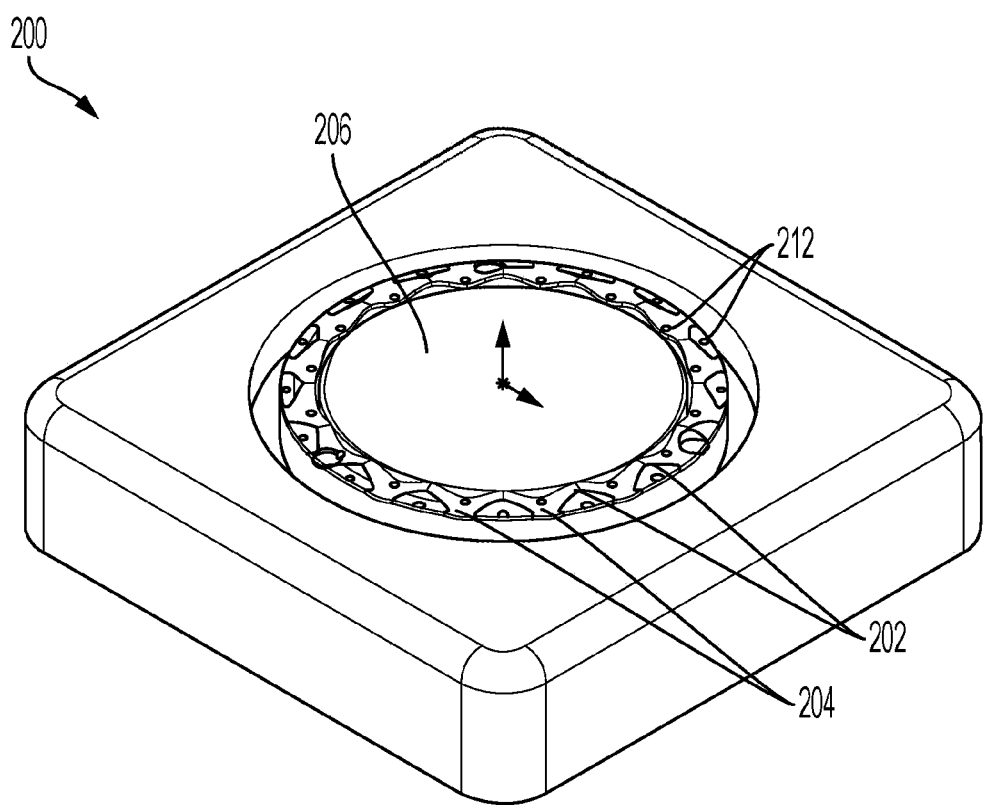
FIG. 5A shows a schematic of a curved support according to one embodiment.
Figure 5B:
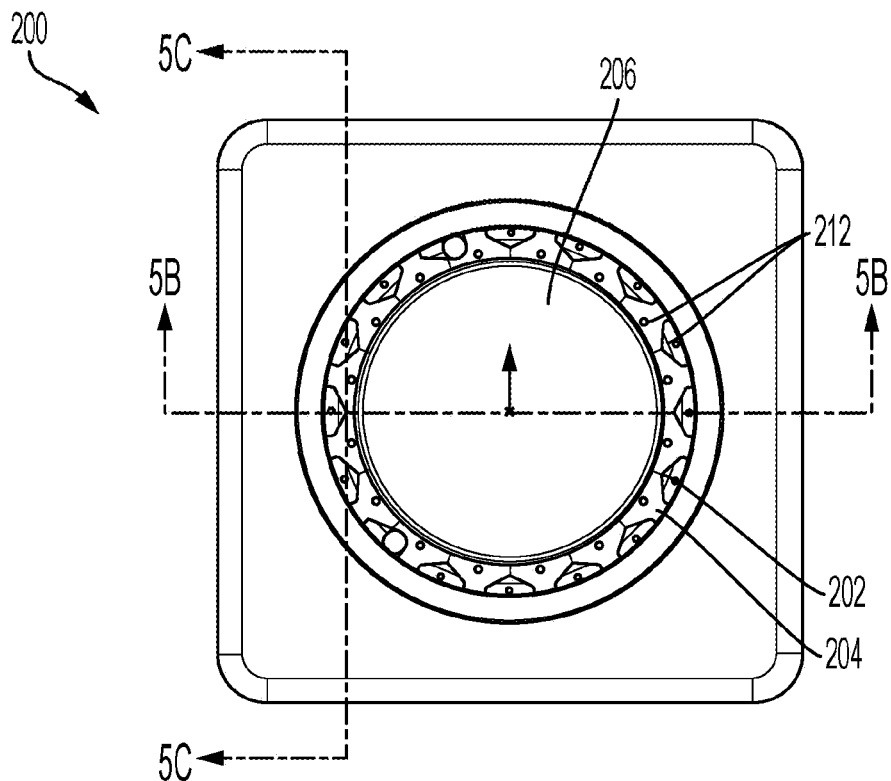
FIG. 5B shows a top view of the curved support of FIG. 5A.
Figure 5C:
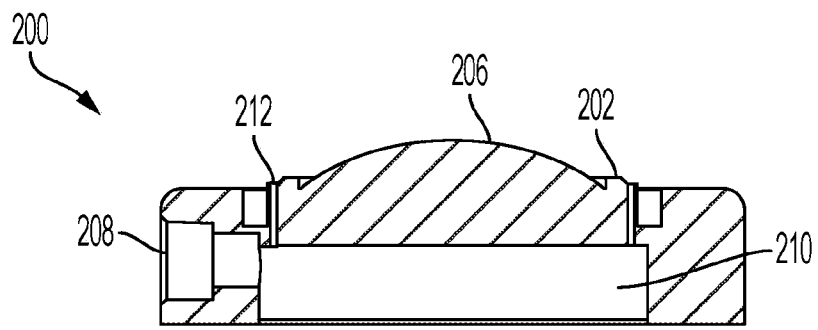
FIG. 5C shows a cross-sectional view of a center plane of the curved support of FIG. 5A
Figure 5D:
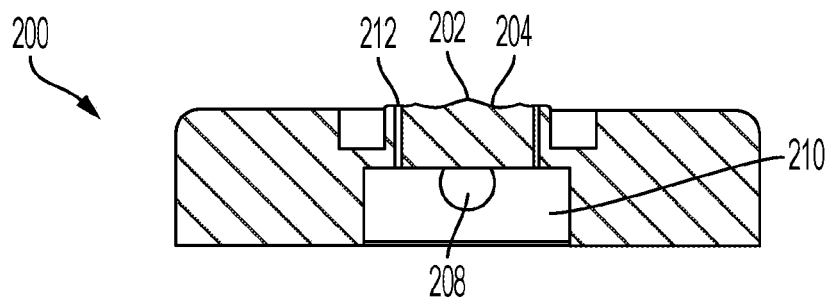
FIG. 5D shows a cross-sectional view of a side plane of the curved support of FIG. 5A

FIGS. 4A-4B depict one embodiment of a macroencapsulation device after the membranes have been mounted to a corresponding frame and prior to being filled with a desired material such as a population of cells. Specifically, as illustrated in the figures, the macroencapsulation device may include a first membrane 102, a second membrane 104, and a frame 220 that extends along at least a portion of the perimeter of the first and second membranes. The device is illustrated in an unfilled relaxed state where the extra surface area of the first and second membranes relative to the transverse cross-sectional area of the frame within which the membranes are mounted causes the bonded membranes to hang below the frame due to the resulting slack in the membranes. Due to the bonded portions 122 located within an interior region of the device, through holes 132, and other appropriate features having already been formed on the membranes, the macroencapsulation device may now be easily filled with a desired material, such as a population of cells, with minimal additional processing and handling. The interior volume may be filled using a port, an opening in the perimeter bond and/or any other appropriate method. In either case, after filling a macroencapsulation device with a desired material, the internal volume contained between the first and second membranes 102 and 104 may expand which may take up the slack in the membranes as the membranes are placed under tension in the filled configuration due to the internal volume between the membranes expanding. This may result in the first and second membranes being deformed such that the membranes generally extend in a direction that is approximately parallel to a plane of the frame 220, see FIG. 4C. Correspondingly, the first and second membranes may now extend outwards from opposing surfaces of the frame by approximately equal distance due to this increase in the internal volume of the now filled device. In instances where portions 132 of the membranes have been bonded together at a location located radially inwards from the frame, the expanded structure may again form a plurality of interconnected channels 126.

A macroencapsulation device may be filled using any appropriate filling method. For example, a population of cells, or other desired material, may be flowed into an interior volume of the macroencapsulation device formed between the outer membranes of the device. This may be accomplished through the use of a sealable or removable port extending into the interior volume and/or there may be an opening in the perimeter bond and/or frame of the macroencapsulation device that may be subsequently sealed. While any appropriate inlet to the interior volume may be used to flow material into the interior volume of the device, the flow of this material may be controlled in a number of different ways to provide the desired filling of the interior volume. For example, in one embodiment, a pressure applied to an interior volume of the macroencapsulation device may correspond to a desired amount of tension present in the membranes of the device in the filled configuration. Accordingly, filling of the device may continue until a predetermined pressure and/or membrane tension threshold has been reached. However, any appropriate method for controlling the amount of material flowed into the interior volume may also be used as the disclosure is not limited in this fashion. This may include, for example, control based on an absolute volume of material flowed into the interior volume, time duration for a given flow rate, and/or any other appropriate control method.

FIGS. 5A-5D depict a specific embodiment of a support 200 which may be used during mounting of a frame to a membrane held on the support. The support may include a curved support surface 206 used to support the active diffusive portions of a stack of membranes during a frame mounting process. In the depicted embodiment the support surface is a spherical dome though other appropriate shapes may be used for the supporting surface as previously discussed. The support surface may be used to support and deform membranes placed thereon as described above in regards to FIGS. 2A-2E. A support may also include a corrugated surface extending around a perimeter of the primary curved support surface. For example, a corrugated surface may include a plurality of alternating ridges 202 and troughs 204 that extend radially outwards from an adjacent portion of the curved support surface. In some instances, the ridges may extend vertically upwards above an adjacent portion of the curved support surface and the troughs may extend vertically downwards below an adjacent portion of the curved support surface. However, different vertical arrangements of the ridges and troughs relative to the adjacent curved support surface are also contemplated. In either case, the corrugated surface including height variations along its length may extend at least partially around, and in the depicted embodiment entirely around, a perimeter of the adjacent curved support surface. As detailed further below in the examples, this corrugated surface may help guide portions of a stack of membranes into a desired folded, pleated, corrugated, or otherwise deformed configuration to handle the excess material of the membranes in this location during a frame mounting process.

In the above embodiment, a vertical direction of the support may be defined as vertically upwards relative to a base of the support underlying the curved support surface.

In some embodiments, and as described previously, a support 200 may be configured to apply a vacuum to a stack of membranes disposed thereon. For example, as shown in the figures, a vacuum connection 208 may be fluidly connected to a central vacuum compartment 210 formed in the support. This central vacuum chamber may also be fluidly connected to vacuum holes 212 extending upwards to a curved supporting surface 206 of the support where a stack of membranes may be located. These vacuum holes may be distributed around a perimeter of the support surface, though the vacuum holes may also be located in other appropriate locations as well. For example, as illustrated in the figures, the vacuum holes may be distributed such that at least one vacuum hole is located on each ridge 202 and trough 204 of the corrugated surface extending around the curved support surface 206. However, it should be understood that any appropriate arrangement of vacuum holes may be used as the disclosure is not limited to using vacuum holes only in these locations. Again, in some embodiments, the vacuum holes may be located such that they may be applied to non-diffusive portions of membranes disposed thereon during a frame mounting process. Regardless, the vacuum holes may apply a vacuum suction from the vacuum connection to one or more portions of a stack of membranes disposed on the support surface which may help to maintain an orientation and/or position of the stack of membranes on the support.

Example: Manufacture of a Macroencapsulation Device

Figure 6A:
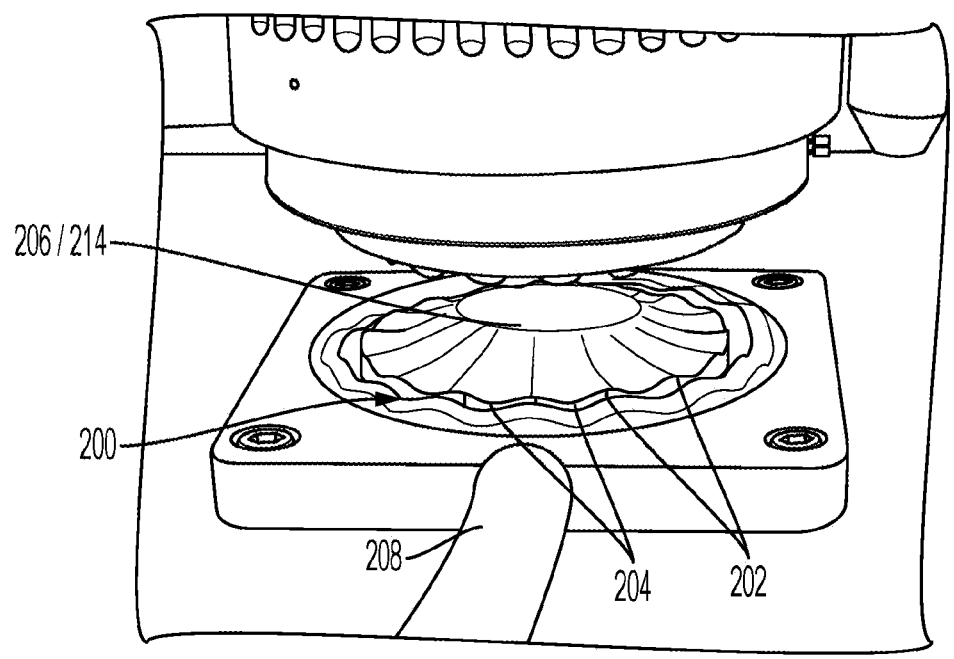
FIG. 6A shows an image of a stack of membranes disposed on a curved support according to one embodiment.
Figure 6B:
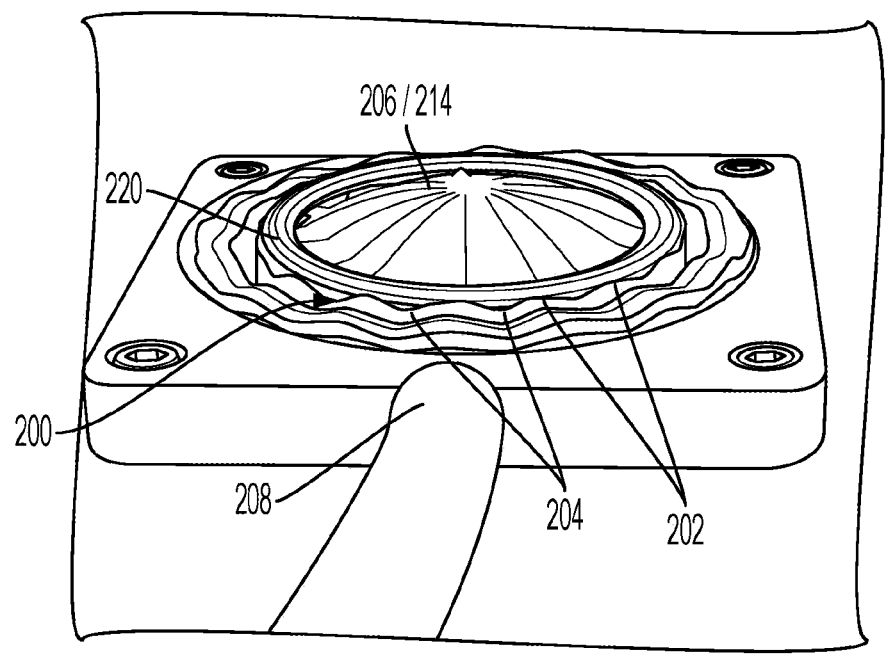
FIG. 6B shows an image of a frame mounted on a stack of membranes disposed on a curved support according to one embodiment.

FIGS. 6A-6B illustrate the use of a support 200 similar to that described above in relation to FIGS. 5A-5D. Again, the support may include a curved support surface 206 and a corrugated surface including a plurality of alternating ridges 202 and troughs 204 extending at least partially around a perimeter of the curved support surface. A stack of bonded membranes 214 is disposed on the support surface with an exterior portion of the membranes extending onto the ridges and troughs of the corrugated surface. Due to the size mismatch between the undeformed planar configuration of the membranes and a diameter of the curved support surface adjacent to the corrugated surface, a size of the membranes in this location is larger than a diameter of the curved support. The resulting excess material of the membranes extending outwards onto the corrugated surface may be deformed to conform to a shape of the ridges and troughs of the corrugated surface to accommodate the presence of this excess material. The stack of membranes may be deformed using a vacuum applied to one or more portions of the membranes by a vacuum connection 208 of the support though other fixation methods including mechanical clamping, temporary adhesives, and other appropriate method may also be used. In either case, the stack of membranes may be deformed into a folded, pleated, wrinkled, corrugated, or otherwise deformed shape that deforms the membranes from a first larger area to a second smaller area within a transverse plane of the system to account for the noted size mismatch. Due to the periodic nature of the corrugated surface, these deformations of the stack of membranes to a smaller area may be disposed around a perimeter of the stack of membranes. Once appropriately positioned and held on the support in a deformed configuration, a frame 220 may be placed onto a surface in the depicted embodiment, the frame contacts the portions of membranes located at the plurality of ridges extending around the curved support. A subsequent bonding process as previously described may then be implemented to bond the frame to the stack of membranes.

Figure 7A:
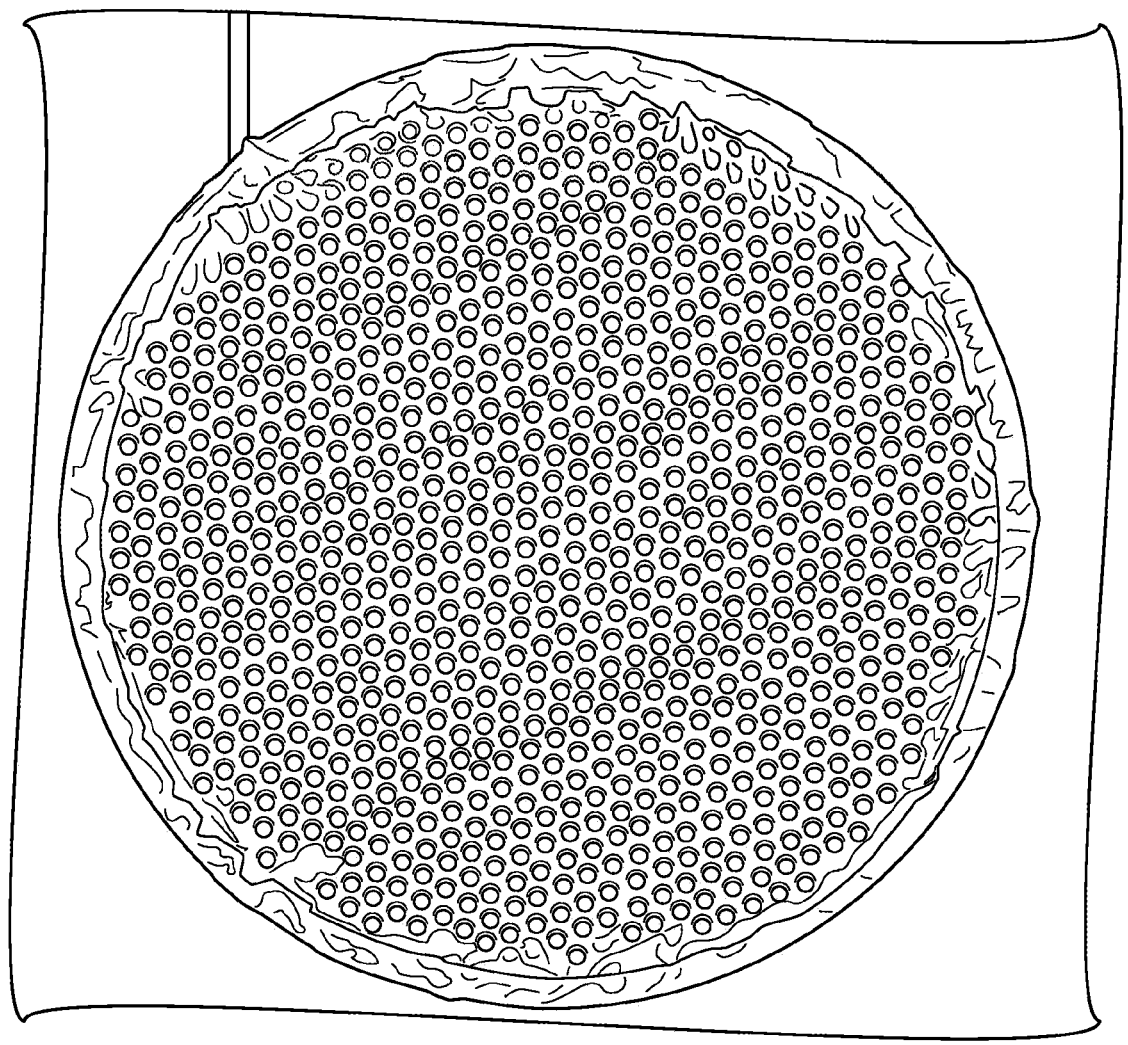
FIG. 7A is a photograph of a macroencapsulation device prior to loading with cells.
Figure 7B:
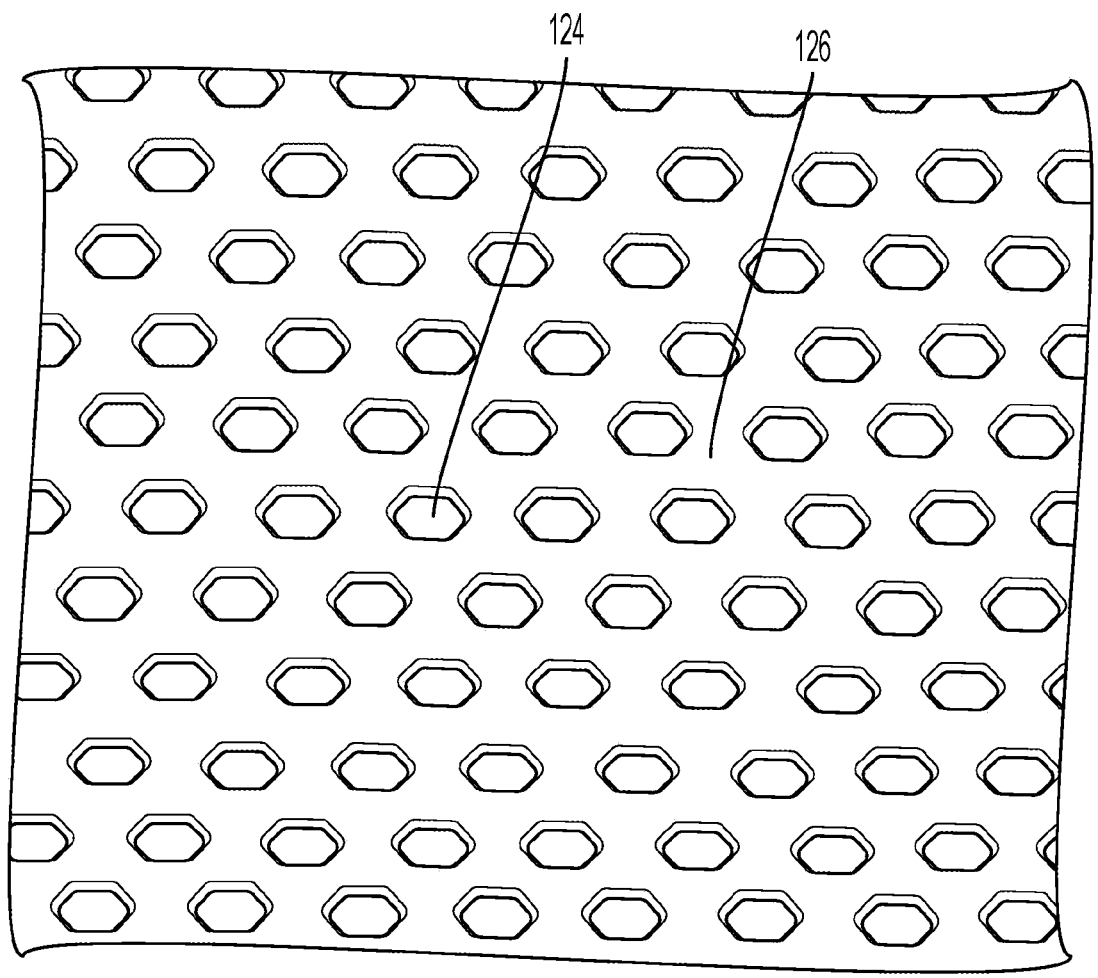
FIG. 7B is a photograph of a portion of the macroencapsulation device of FIG. 7A.

FIG. 7A-7B are photographs of a macroencapsulation device manufactured using a process similar to that described above. The device is in a relaxed state prior to being filled with cells and visibly deformed regions, i.e. wrinkles, in the mounted membranes are distributed around a circumference of the device due to the presence of slack in the membranes. The device includes an array of channels located between bonded portions (as shown by the indented dots) formed on the first and second membrane. FIG. 7B clearly shows the channels 126 and the bonded portions 124.

Example: Device Filling

Figure 8A:
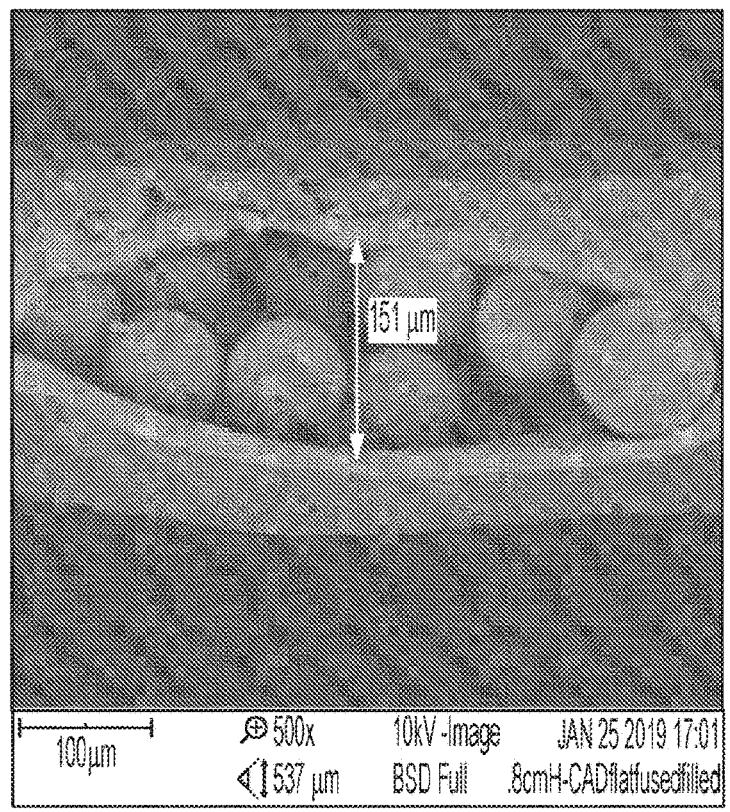
FIG. 8A shows a scanning electron micrograph of a cross section of a first macroencapsulation device with a first amount of membrane slack filled with beads.
Figure 8B:
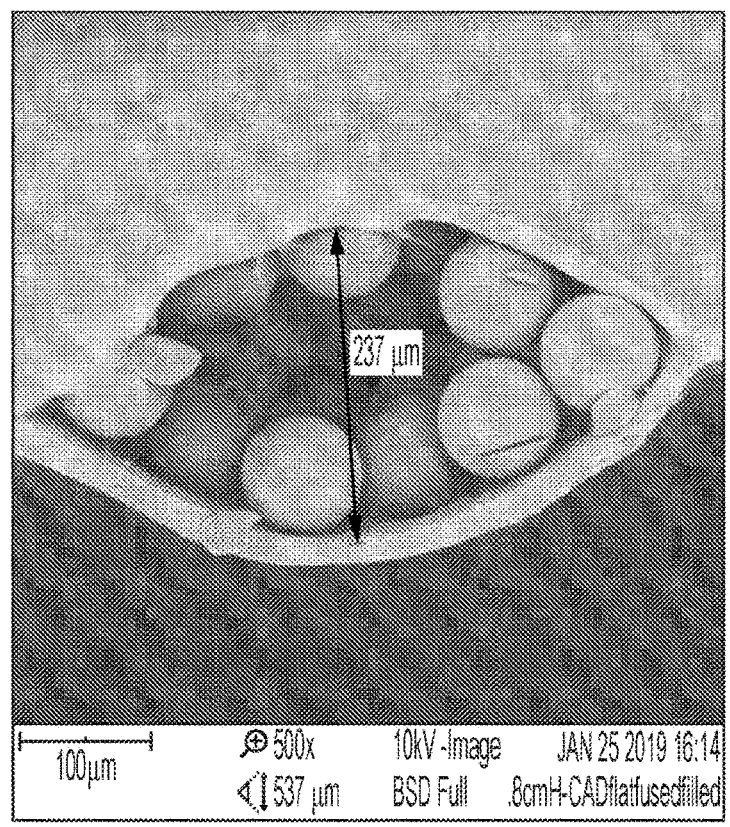
FIG. 8B shows a scanning electron micrograph of a cross section of a second macroencapsulation device with a second amount of membrane slack filled with beads.

FIGS. 8A-8B are scanning electron micrographs of two cross-sectioned macroencapsulation devices with different amounts of membrane relaxation (i.e. 5% and 10% undersizing of a frame relative to a corresponding size of the membranes). The devices were filled with 150 µm beads which have a size representative of the average diameter of a human islet to measure the compartment height of the filled devices. As shown in the figures the first device shown in FIG. 8A corresponding to a 5% undersizing of the frame contained less beads than the second device shown in FIG. 8B corresponding to a 10% undersizing of the frame, and is associated with a smaller compartment height compared to the second device. Therefore, both compartment height and filling volume are larger for devices with increased degrees of undersizing of a frame relative to the associated mounted membranes. Additionally, an attempt was made to fill a device with 0% percent membrane relaxation, the device failed to fill confirming that membranes mounted in a relaxed configuration with some amount of slack may enable easier filling of a device with cells or other materials.

Example: Varying Frame Dimensions

Figure 9:
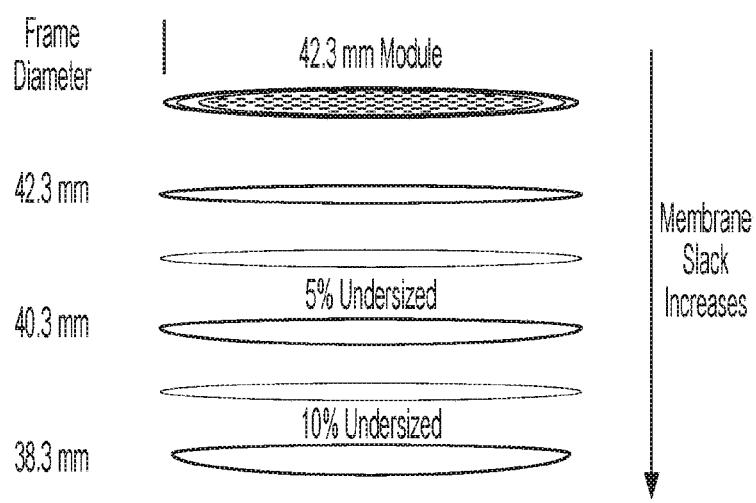
FIG. 9 is a schematic of the relative changes in membrane slack with changes in frame sizing.

FIG. 9 is an illustration of the concept of membrane relaxation where a membrane of a predetermined size is mounted onto frames with different diameters. As shown, a bonded pair of membranes (e.g., a first and a second membrane bonded at their perimeter) has a diameter of 42.3 mm and is mounted onto frames of different sizes (e.g. diameters of 42.3 mm, 40.2 mm, 38.3 mm). The degree of undersizing of the frame was calculated as a percentage of the difference in diameter between the perimeter frame and the membranes with respect to the diameter of the stack of membranes. Undersizing of the frame by a degree of 0%, 5%, 10% undersizing correlated to perimeter frames of 42.3 mm, 40.3 mm, and 38.3 mm, respectively. To accommodate the excess surface area of the membrane module when mounting the membranes to an undersized frame, an increase in the degree of membrane relaxation (i.e., membrane slack) was observed with increasing degrees of undersizing of the frame with respect to the size of the membrane.

Example: Internal Volume Dimensions Versus Slack

Figure 10A:
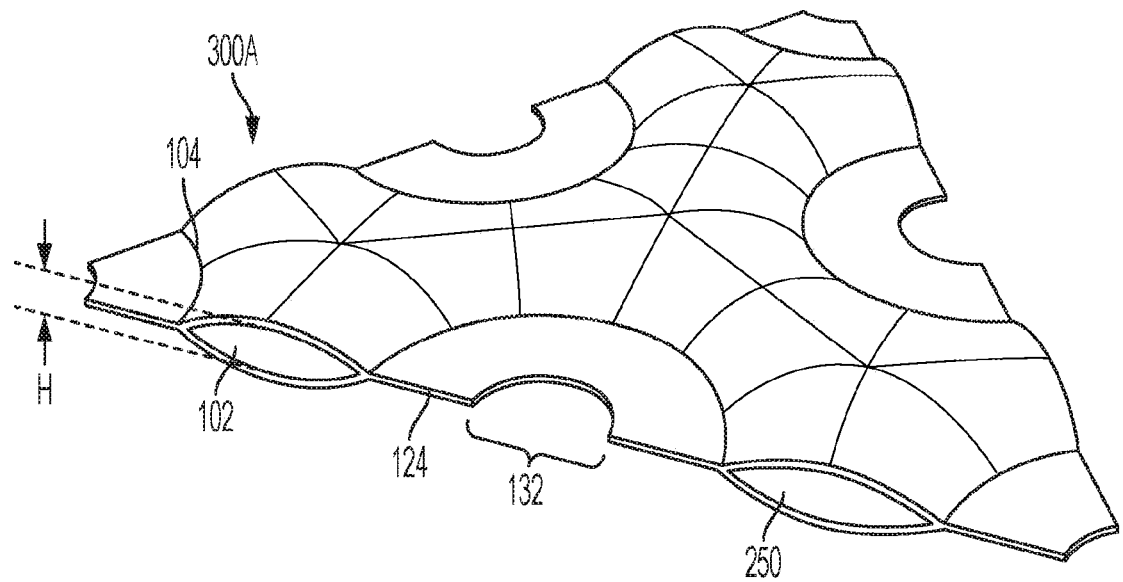
FIG. 10A shows a schematic drawing of a section of a portion of a first exemplary macroencapsulation device with a first amount of membrane slack during mounting after filing.
Figure 10B:
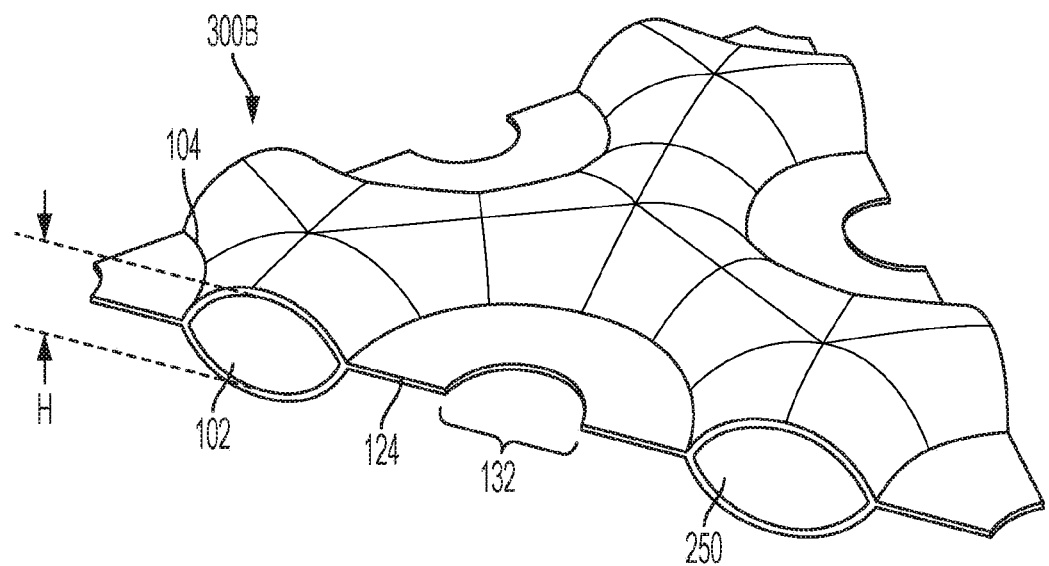
FIG. 10B shows a schematic drawing of a section of a portion of a second exemplary macroencapsulation with a second amount of slack during mounting after filing.

FIGS. 10A and 10B illustrate diagrams of macroencapsulation devices that have been filed where the two devices have different amounts of undersizing of a frame versus an undeformed dimension of the associated membranes. Specifically, the macroencapsulation device 300A of FIG. 10A was modeled with a smaller amount of undersizing as compared to the macroencapsulation device 300B of FIG. 10B. Similar to the above described embodiments, the device may include a first membrane 104 and a second membrane 104 bonded along their perimeters to form an internal volume 250 between the membranes. The depicted device also includes bonded portions 124 with through holes 132 located within a central portion of the membranes disposed within a frame, not depicted. Mathematical modeling was used to determine the membrane structure when filled under equilibrium conditions to a predetermined tension of the membranes. The determined compartment height H associated with channels forming the interior volume 250, and depicted in the figures, may be measured in a direction that is perpendicular to a plane in which the membranes and associated frame generally positioned. It was observed that device 300A of FIG. 10A with the smaller degree of frame undersizing, resulted in a smaller compartment height after filing as compared to the device 300B of FIG. 10B which had a large degree of undersizing and correspondingly larger amount of membrane relaxation or slack.

Example: Controlling Device Structure

Without wishing to be bound by theory, it is possible to control chamber height of the channels formed in a device as well as the overall internal volume by controlling the degree of undersizing of a frame relative to a size of the associated membranes. Similar to the above, membranes with a diameter of 42.3 mm may be mounted to frames of varying diameters and channels may be formed in the membranes with a fixed channel spacing and diameter. Mathematical modeling was used to estimate the chamber height and volume by fixing the geometric properties of the channels (e.g., channel spacing, channel diameter), the internal volume and chamber height were then predicted at filling equilibrium by the difference in the surface area between the bonded membranes mounted under tension compared to the relaxed mounting state afforded by the reduced surface area associated with the dimensions of the frame. As shown in the table below, both the chamber height and overall internal volume increased with a decreasing diameter of the frame corresponding to an increased mismatch between the areas of the membranes and frame and an increasing amount of membrane slack prior to filling.

TABLE I

| Diameter of perimeter frames (mm) | Internal Volume at Equilibrium Filling | Maximum Chamber Height |
| --- | --- | --- |
| 42.3 mm | 0 µL | 0 µm |
| 40.3 mm | 58 µL | 160 µm |
| 38.3 mm | 100 µL | 322 µm |

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A macroencapsulation device for housing a population of cells comprising:
   a first membrane;
   a second membrane disposed on the first membrane, wherein the first membrane and the second membrane are bonded along a perimeter of the first and second membranes to form an internal volume there between, wherein the first membrane and/or the second membrane is semipermeable; and
   a frame that extends along at least a portion of the perimeter of the first and second membranes, and wherein a surface area of the first and/or second membrane is greater than a transverse cross sectional area of the frame in a plane in which the frame extends and the first and second membranes are mounted within;
   wherein the internal volume is configured to house the population of cells.

2. The macroencapsulation device of claim 1, wherein the frame extends completely around the perimeter of the first and second membranes.

3. The macroencapsulation device of claim 1, wherein the first and second membranes are configured to block passage of the population of cells out of the device.

4. The macroencapsulation device of claim 3, further comprising the population of cells disposed in the internal volume.

5. The macroencapsulation device of claim 1, wherein the internal volume includes a plurality of channels.

6. The macroencapsulation device of claim 5, further comprising a plurality of bonded portions of the first and second membrane disposed radially inward from the frame that form the plurality of channels, and wherein at least some of the bonded portions include a through hole passing there through.

7. The macroencapsulation device of claim 1, wherein the first membrane and/or the second membrane is sintered.

8. The macroencapsulation device of claim 1, wherein the first and/or second membranes includes a hydrophilic coating.

9. The macroencapsulation device of claim 1, wherein the plane in which the frame extends is a plane in which a maximum transverse dimension of the macroencapsulation device is located.

10. The macroencapsulation device of claim 1, wherein the plane in which the frame extends is a plane in which the first and/or second membrane are mounted.

11. The macroencapsulation device of claim 1, wherein the first membrane is directly bonded to the second membrane.

12. A macroencapsulation device for housing a population of cells comprising:
   a first membrane;
   a second membrane disposed on the first membrane, wherein the first membrane and the second membrane are bonded along a perimeter of the first and second membranes to form an internal volume there between, wherein the first membrane and/or the second membrane is semipermeable; and
   a frame that extends along at least a portion of the perimeter of the first and second membranes, and wherein a portion of the first and second membranes connected to the frame is deformed to fit within an area of the frame that is smaller than an area of the portion of the first and second membranes in an undeformed configuration;
   wherein the internal volume is configured to house the population of cells.

13. The macroencapsulation device of claim 12, wherein the portion of the first and second membranes connected to the frame includes a plurality of locations disposed around a perimeter of the frame where the first and second membranes are deformed from a first larger area to a second smaller area.

14. The macroencapsulation device of claim 12, wherein a surface area of the first and/or second membrane is greater than a transverse cross sectional area of the frame the first and second membranes are mounted within.

15. The macroencapsulation device of claim 12, wherein the frame extends completely around the perimeter of the first and second membranes.

16. The macroencapsulation device of claim 12, wherein the first and second membranes are configured to block passage of the population of cells out of the device.

17. The macroencapsulation device of claim 16, further comprising the population of cells disposed in the internal volume.

18. The macroencapsulation device of claim 12, wherein the internal volume includes a plurality of channels.

19. The macroencapsulation device of claim 18, further comprising a plurality of bonded portions of the first and second membrane disposed radially inward from the frame that form the plurality of channels, and wherein at least some of the bonded portions include a through hole passing there through.

20. The macroencapsulation device of claim 12, wherein the first membrane and/or the second membrane is sintered.

21. The macroencapsulation device of claim 12, wherein the first and/or second membranes includes a hydrophilic coating.

22. The macroencapsulation device of claim 12, wherein the first membrane is directly bonded to the second membrane.

23. The macroencapsulation device of claim 12, wherein the area of the frame is along a plane in which the first and/or second membrane is mounted.

* * * * *